US010576361B1

(12) United States Patent
Snow

(10) Patent No.: US 10,576,361 B1
(45) Date of Patent: Mar. 3, 2020

(54) CARD GAME AND METHOD OF PLAYING

(71) Applicant: Scott Russell Norman Gilbert Snow, Los Angeles, CA (US)

(72) Inventor: Scott Russell Norman Gilbert Snow, Los Angeles, CA (US)

( * ) Notice: Subject to any disclaimer, the term of this patent is extended or adjusted under 35 U.S.C. 154(b) by 0 days.

(21) Appl. No.: 15/901,840

(22) Filed: Feb. 21, 2018

Related U.S. Application Data

(60) Provisional application No. 62/461,707, filed on Feb. 21, 2017.

(51) Int. Cl.
| | |
|---|---|
| A63F 1/00 | (2006.01) |
| A63F 1/02 | (2006.01) |
| A63F 11/00 | (2006.01) |
| A63F 13/822 | (2014.01) |
| A63F 1/04 | (2006.01) |
| A63F 3/00 | (2006.01) |

(52) U.S. Cl.
CPC ............... *A63F 1/02* (2013.01); *A63F 1/00* (2013.01); *A63F 11/0074* (2013.01); *A63F 13/822* (2014.09); *A63F 3/00094* (2013.01); *A63F 3/00097* (2013.01); *A63F 2001/008* (2013.01); *A63F 2001/0416* (2013.01); *A63F 2001/0475* (2013.01); *A63F 2001/0491* (2013.01); *A63F 2011/0086* (2013.01); *A63F 2300/807* (2013.01)

(58) Field of Classification Search
CPC ............... A63F 11/0074; A63F 13/822; A63F 2300/807; A63F 3/00097; A63F 2011/0086; A63F 1/00; A63F 9/20; A63F 2001/0475; A63F 2001/0416; A63F 2001/0491; A63F 3/0094; A63F 3/00094

USPC ....... 273/292–294, 296, 299, 308, 264, 271, 273/275, 303, 305
See application file for complete search history.

(56) References Cited

U.S. PATENT DOCUMENTS

| | | | | |
|---|---|---|---|---|
| 3,042,408 A | * | 7/1962 | Johnson | A63F 1/02 273/156 |
| 4,285,522 A | * | 8/1981 | Turner | A63F 9/20 273/271 |
| 9,061,196 B2 | * | 6/2015 | Kingsley | A63F 3/00643 |
| 2016/0067590 A1 | * | 3/2016 | Jackman | A63F 1/00 273/292 |
| 2018/0147480 A1 | * | 5/2018 | Krause | A63F 1/02 |

OTHER PUBLICATIONS

Stratego Instructions, 1996, pp. 1-6, Milton Bradley Company.
The Original Game of Connect 4, 2009, 4 pages, Hasbro.
(Continued)

*Primary Examiner* — Benjamin Layno
(74) *Attorney, Agent, or Firm* — Knobbe Martens Olson & Bear LLP

(57) ABSTRACT

A deck of playing cards and a method of playing a game are provided. An object of the game is to form two lines on a grid, wherein a line is defined by a horizontal or vertical line of four in a row of the same player's cards. A further object of the game may be to form two strings on a grid, where a string is defined as a horizontal or vertical line made up of the same player's cards, the cards of each string containing four different elements, with a different element appearing on each card of the string. The game may be played with physical cards or in a virtual environment executed by a video game application on a computing device.

17 Claims, 36 Drawing Sheets

(56) References Cited

OTHER PUBLICATIONS

John Yianna, Hive: A Game Buzzing with Possibilities, 2010, 12 pages, Gen42 Games.
Scott Snow, Strings: A Beautiful Game of Connection and Chaos, available at www.stringscards.com (content downloaded on Feb. 27, 2018). Applicant requests the Examiner to treat this content as being published and on sale by inventor Scott Snow in Jun. 2016, though Applicant reserves the right to present further information regarding any alleged disclosure or sale at a later date.
UCLA Daily Bruin, UCLA track student creates 'Strings,' https://www.youtube.com/watch?v=SHeflakhimQ, published on May 25, 2016. Applicant has not enclosed a video at the URL link provided. However, if the Examiner cannot access the video at the above-link, Applicant would be pleased to provide the video at any time upon request.

* cited by examiner

CARD GAME AND METHOD OF PLAYING

CROSS-REFERENCE TO RELATED APPLICATIONS

This application claims the benefit under 35 U.S.C. § 119(e) of U.S. Provisional Patent Application No. 62/461,707, entitled "CARD GAME AND METHOD OF PLAYING," filed Feb. 21, 2017, which is hereby incorporated by reference in its entirety and made part of this specification.

BACKGROUND OF THE INVENTION

Field of the Invention

Certain embodiments described in this application are directed to a card game and method of playing the same. The card game can be played with physical cards or may be played on a computing device such as a personal computer, tablet or mobile device.

DETAILED DESCRIPTION OF THE PREFERRED EMBODIMENTS

Embodiments of the invention are directed to a deck of cards used to play a game and methods of playing a game utilizing the deck of cards.

The term "cards" as used herein is to be interpreted broadly and encompasses both physical cards as well as virtual or electronic representations of cards, such as on a computer screen, a tablet screen, a mobile device screen or other electronic device. When in physical form, cards need not be made of paper and may encompass thicker units such as tiles.

The Deck

Figure 1:
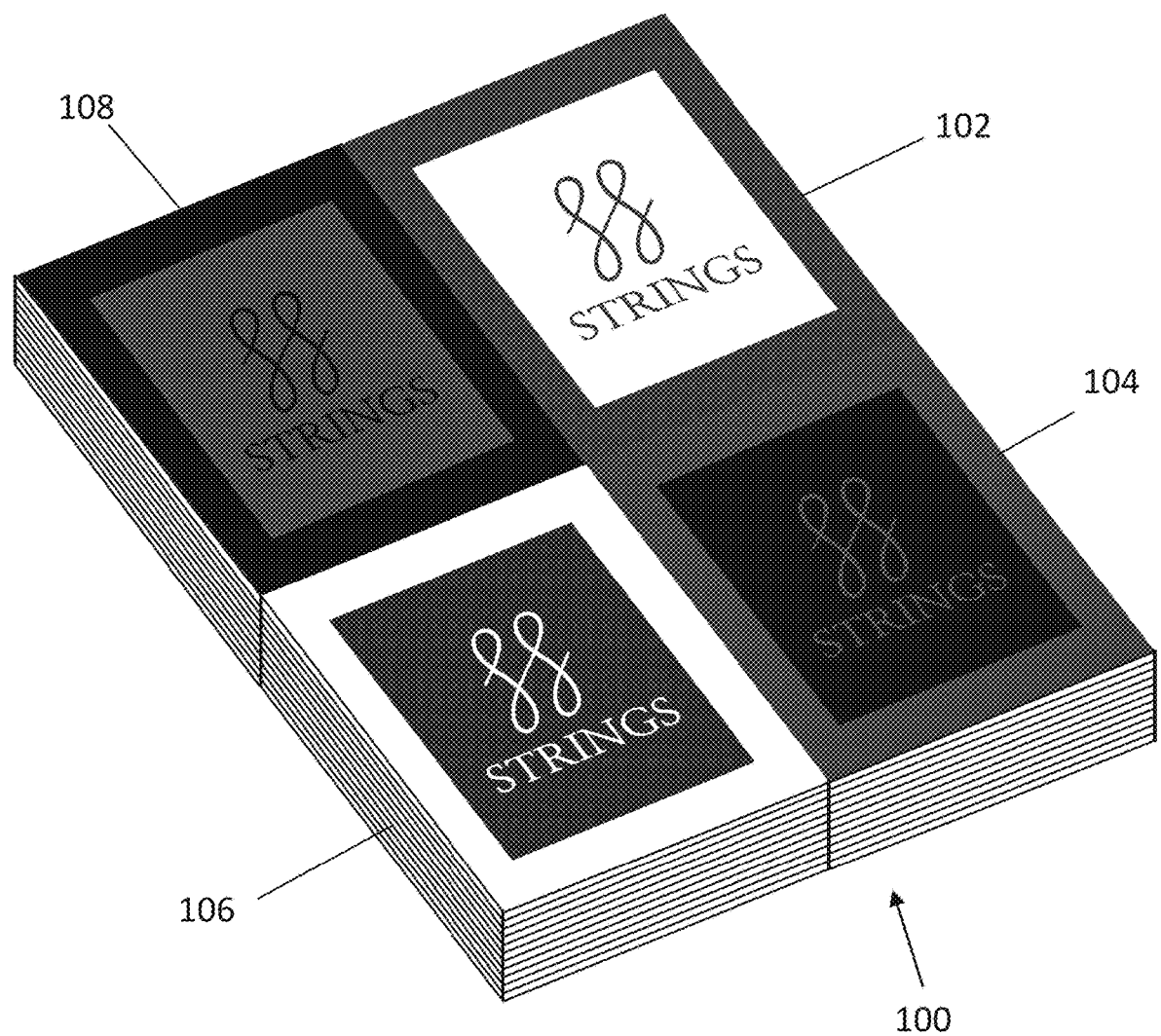
FIG. 1 illustrates one embodiment of a deck of playing cards shown face down.
Figure 2:
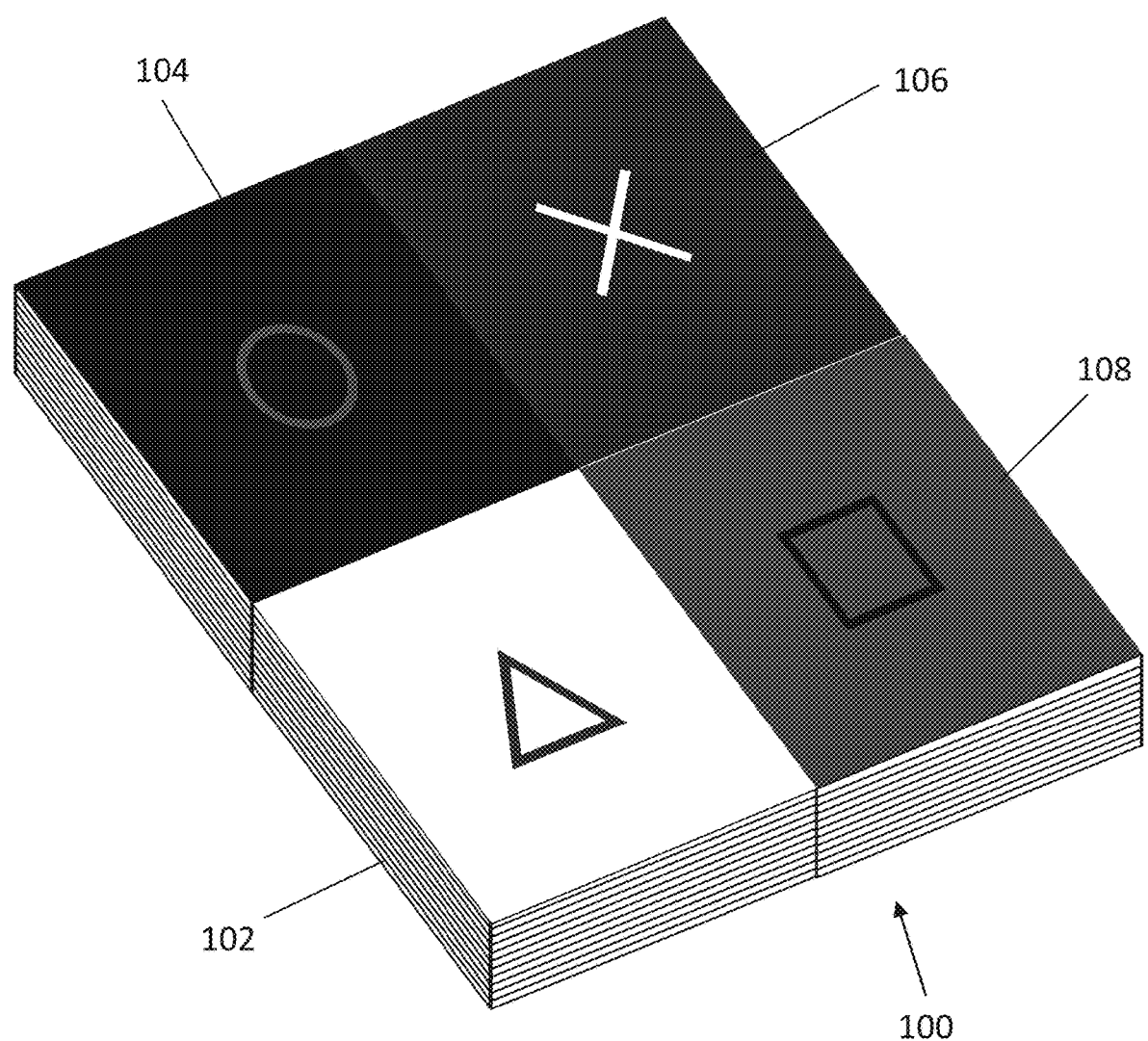
FIG. 2 illustrates the deck of playing cards of FIG. 1, shown face up.

FIGS. 1 and 2 illustrate a deck of playing cards 100 separated into four sets of cards (which may each also be referred to as an individual deck) to be provided to up to four different players. FIG. 1 shows the deck 100 face down, and FIG. 2 shows the deck 100 face up. Each of the cards in all four sets preferably has the same substantially square shape, such as a square shape with rounded corners, a front surface and a back surface. The front and back surfaces of the cards in each of the four sets can include different indicia to indicate that all the cards in a first set 102 belong to a first player or to otherwise identify the first set, that all the cards in a second set 104 belong to a second player or to otherwise identify the second set, that all the cards in a third set 106 belong to a third player or to otherwise identify the third set, and that all the cards in a fourth set 108 belong to a fourth player or to otherwise identify the fourth set. For example, the back surfaces of each card in a set may have the same or similar color or color scheme as other cards in that set, but a different color or color scheme from the back surfaces of cards in the other sets. The front surfaces of each card in a set may also have the same or similar color or color scheme as other cards in that set, but a different color or color scheme from the front surfaces of cards in the other sets. The color or color scheme utilized on the front and back surfaces for all the cards in a given set may generally be the same.

As illustrated in FIGS. 1 and 2, an example of a color scheme for a first set 102 may be a white background with blue print and blue borders, an example of a color scheme for a second set 104 may be a black background with red print and red borders, an example of a color scheme for a third set 106 may be a blue background with white print and white borders, and an example of a color scheme for a fourth set 108 may be a red background with black print and black borders. It will be appreciated that any color or color schemes may be utilized to distinguish among the sets of cards. It will also be appreciated that indicia other than colors may be utilized to identify which set of cards belongs to a certain player.

Figure 3:
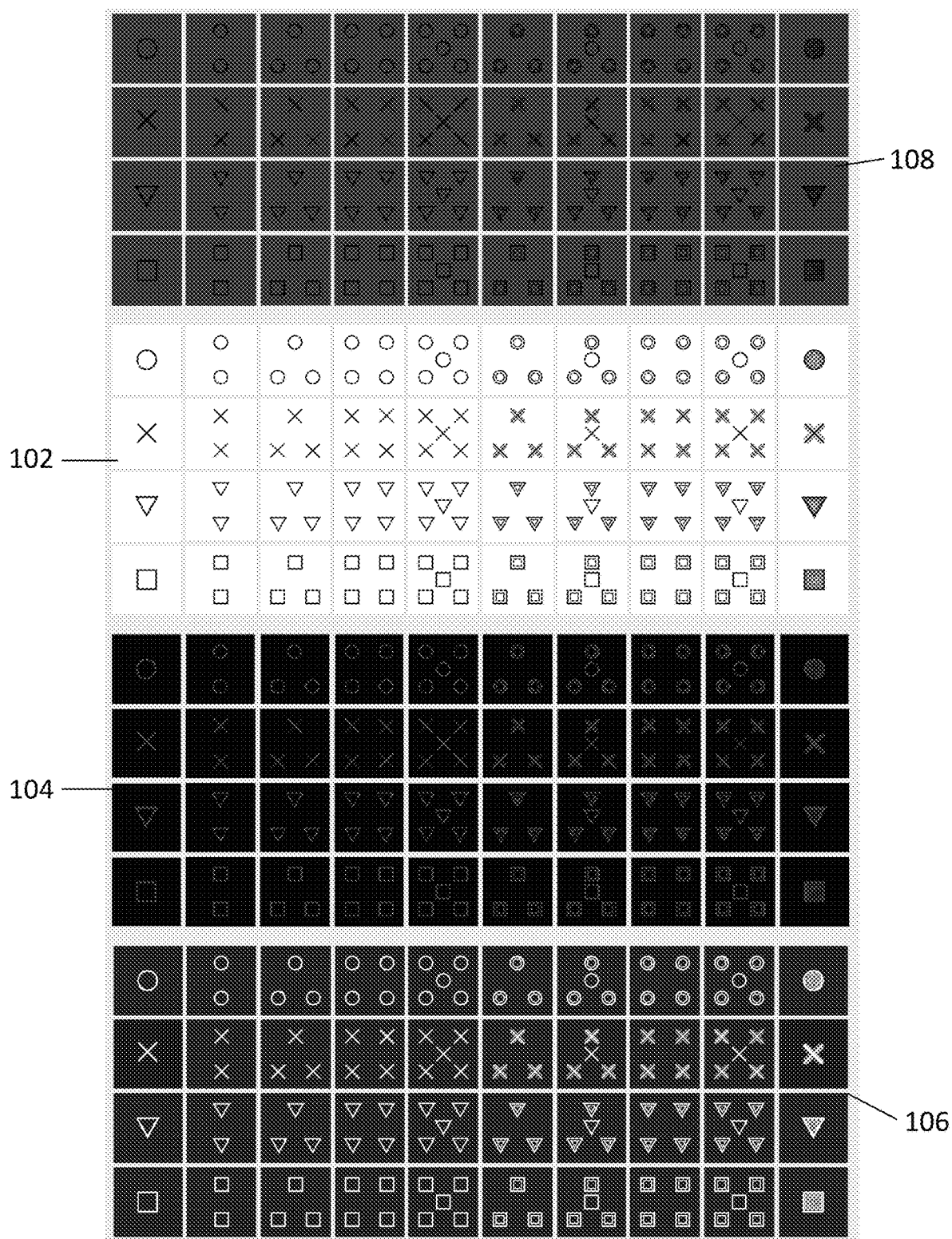
FIG. 3 illustrates each card in the deck of playing cards of FIG. 1, shown face up.
Figure 4:
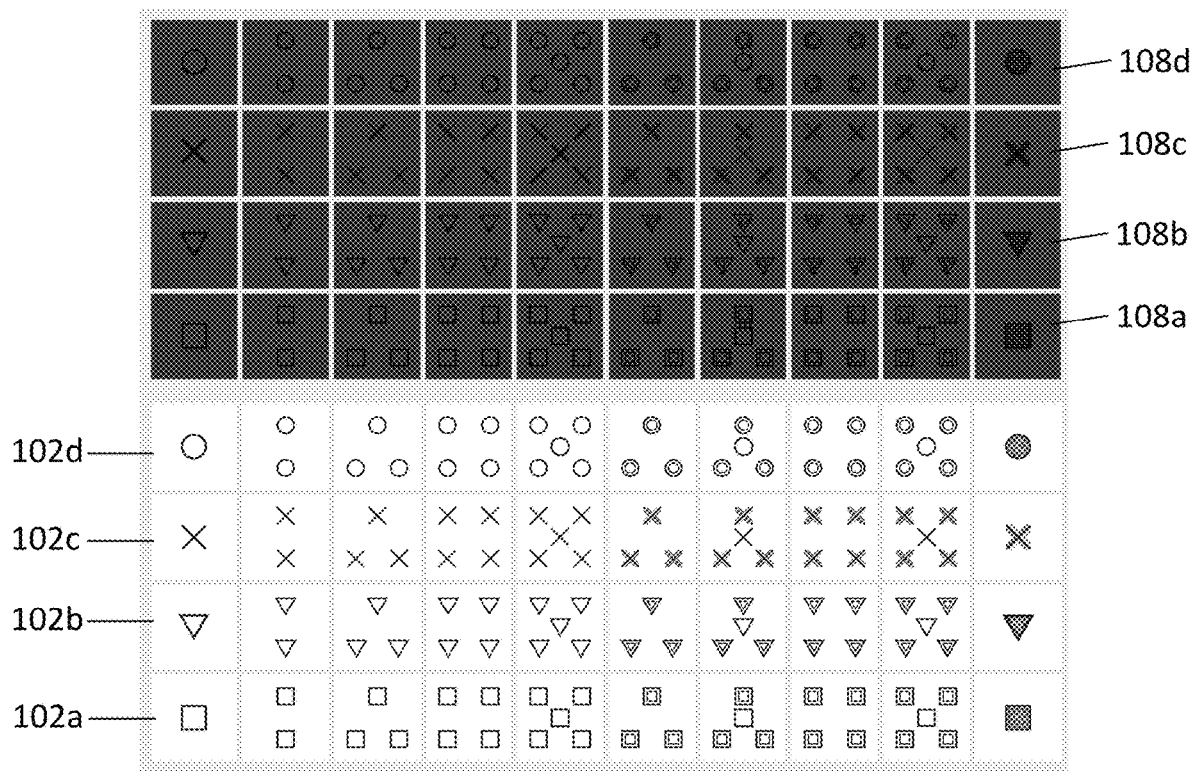
FIG. 4 illustrates two sets of cards within the deck of playing cards of FIG. 1, shown face up.
Figure 5:
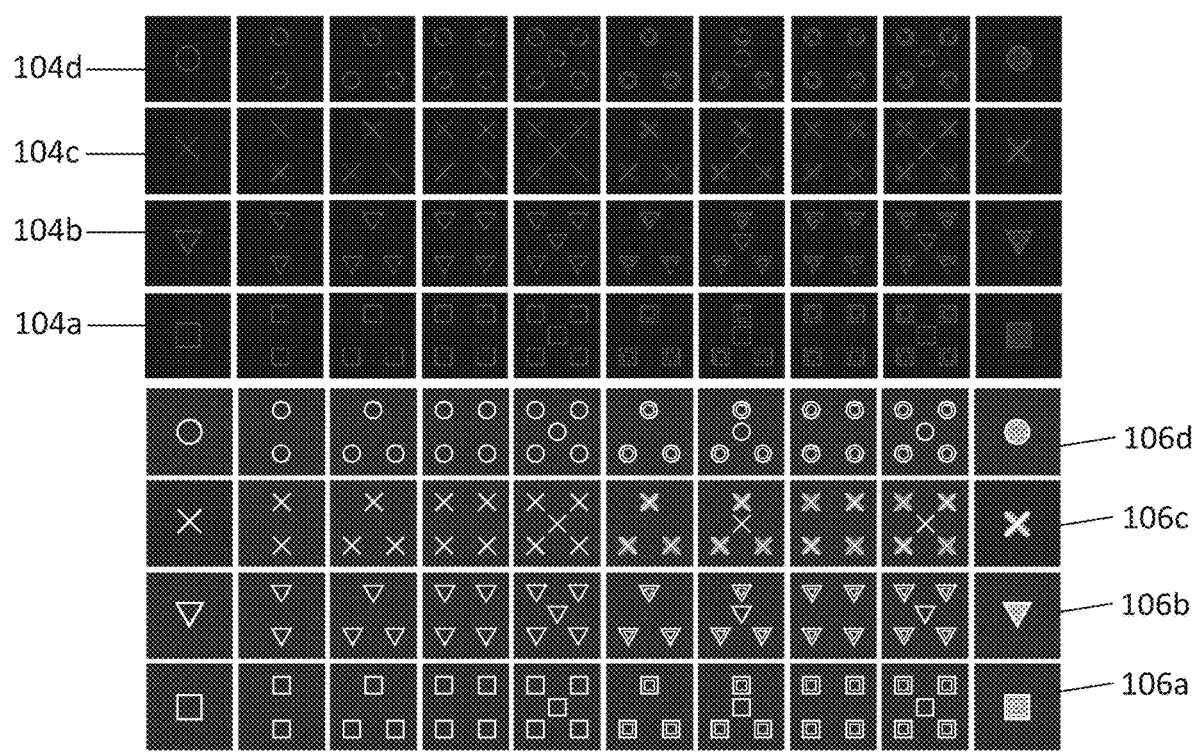
FIG. 5 illustrates two additional sets of cards within the deck of playing cards of FIG. 1, shown face up.
Figure 6:
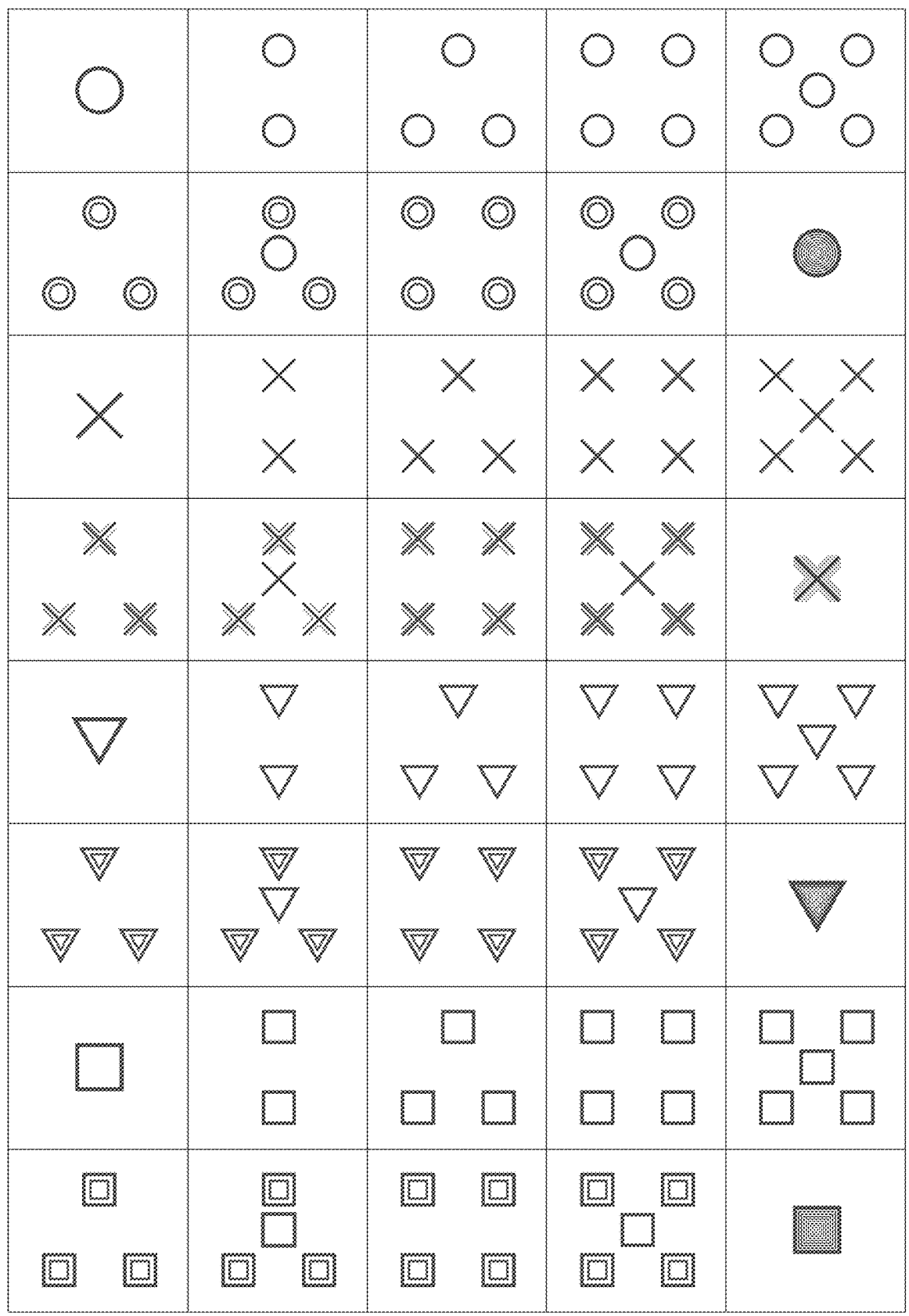
FIG. 6 illustrates the front surfaces of a first set of cards.
Figure 7:
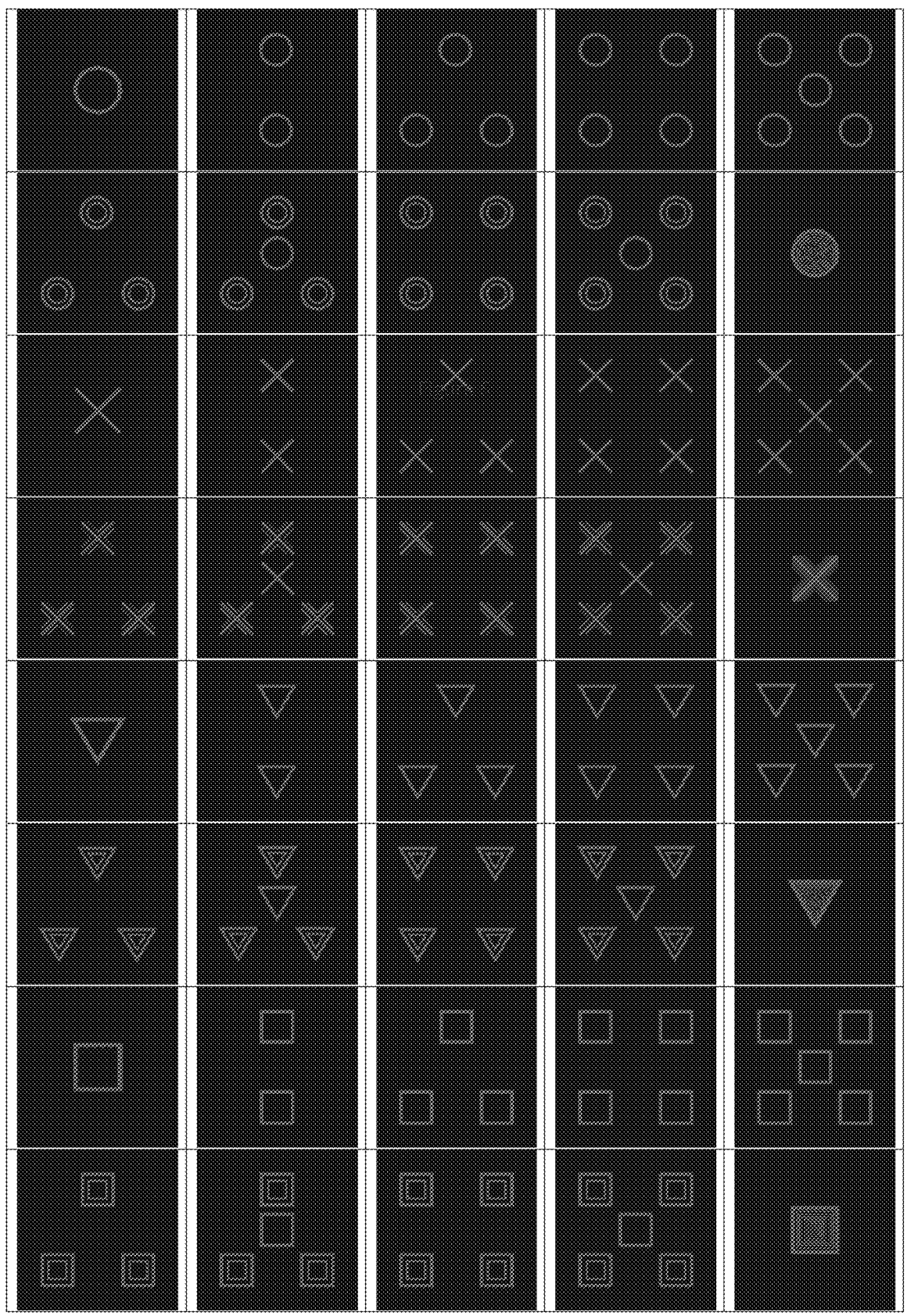
FIG. 7 illustrates the front surfaces of a second set of cards
Figure 8:
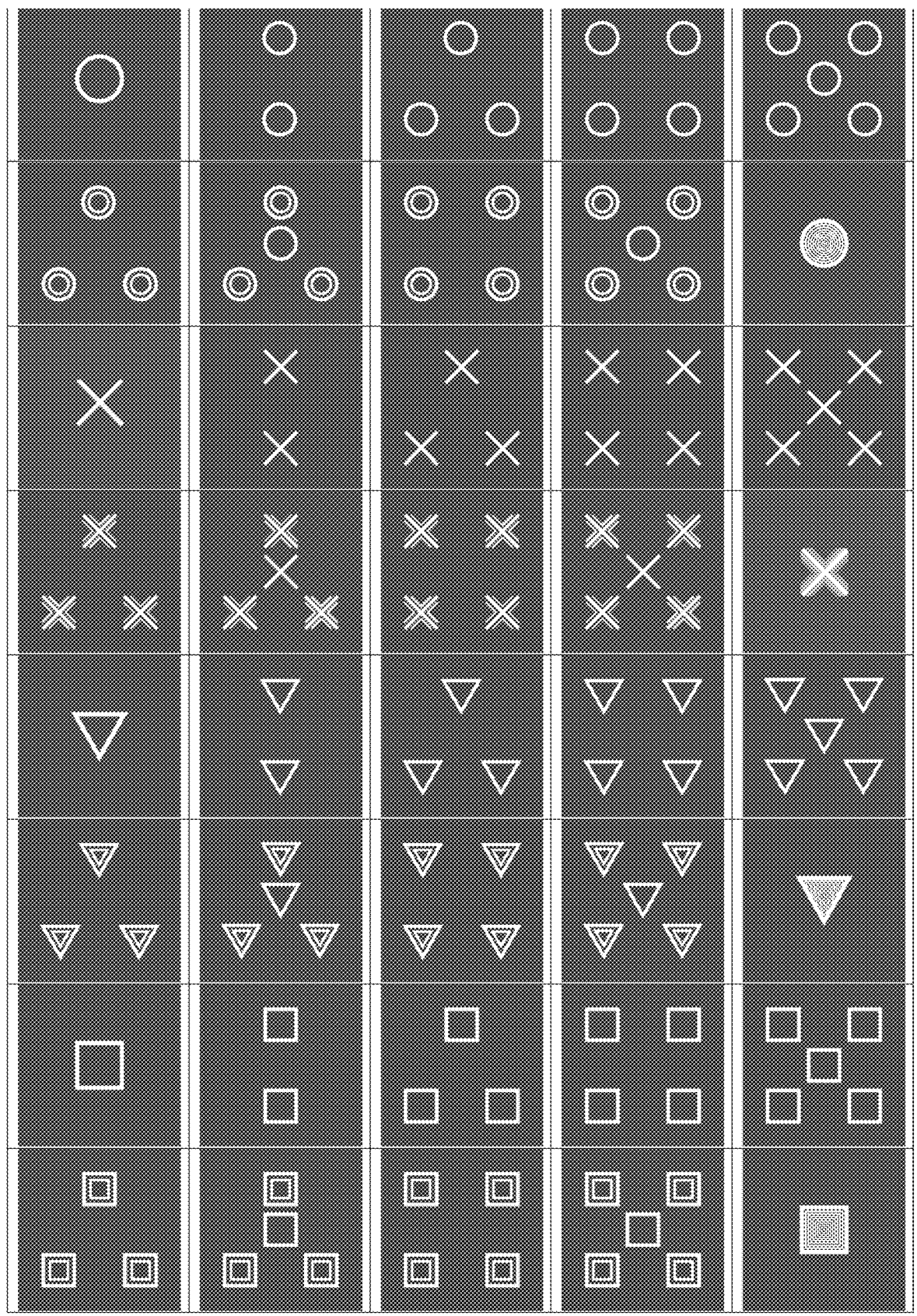
FIG. 8 illustrates the front surfaces of a third set of cards.
Figure 9:
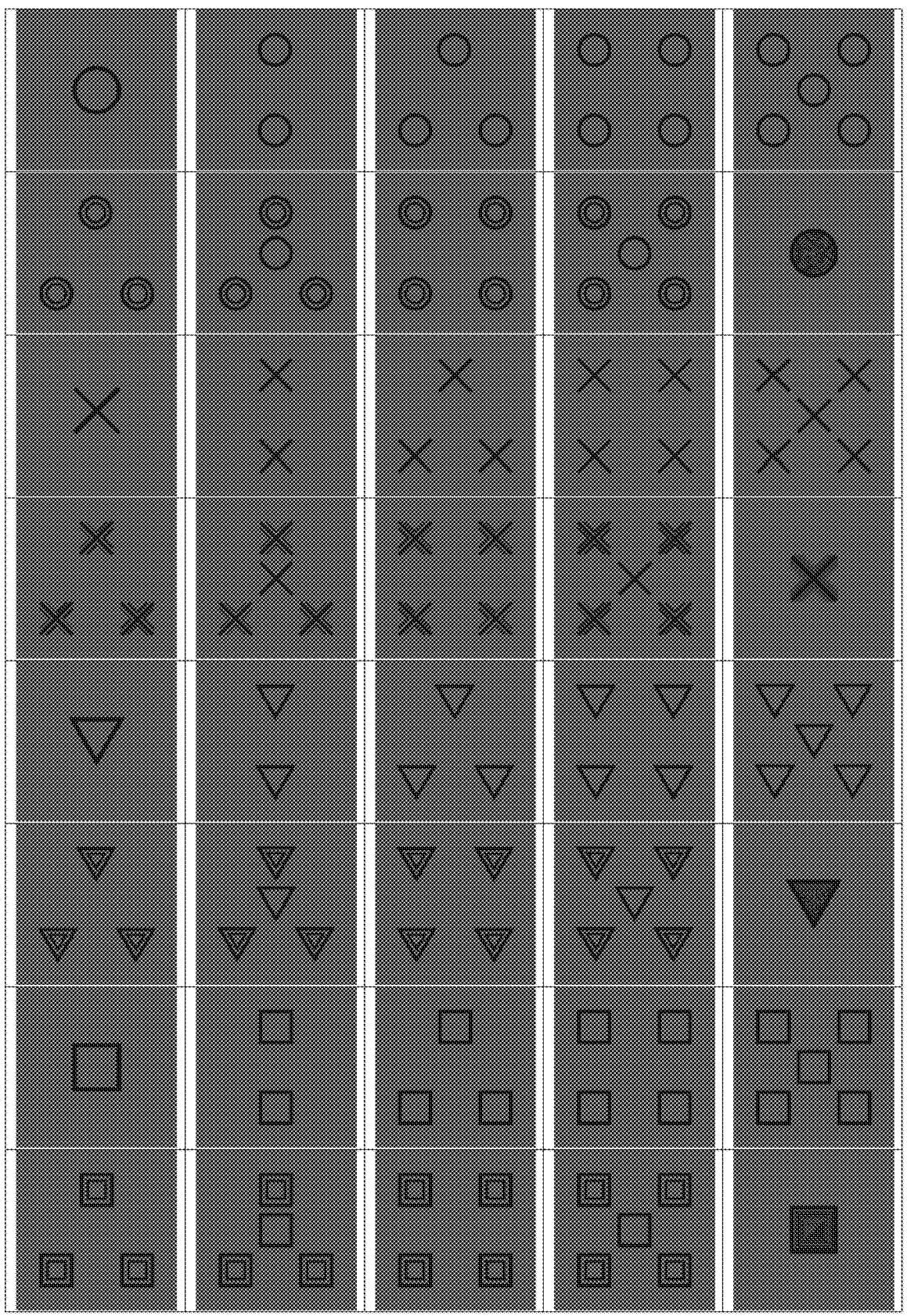
FIG. 9 illustrates the front surfaces of a fourth set of cards.

FIGS. 3-5 illustrate the front surfaces of all of the cards in each of the sets 102, 104, 106 and 108. In one embodiment, each set includes 40 cards divided into four subsets, so that the entire deck 100 comprises 160 cards. Each set may be referred to as an individual deck that may be designated by the background color used on the face and/or back of the cards of the set. As illustrated, set 102 comprises four subsets 102a, 102b, 102c and 102d (as illustrated, this set 102 has a white background and may be referred to as the white deck); set 104 comprises four subsets 104a, 104b, 104c and 104d (as illustrated, this set 104 has a black background and may be referred to as the black deck); set 106 comprises four subsets 106a, 106b, 106c and 106d (as illustrated, this set 106 has a blue background and may be referred to as the blue deck); and set 108 comprises four subsets 108a, 108b, 108c and 108d (as illustrated, this set 108 has a red background and may be referred to as the red deck). FIG. 6 illustrates the front surfaces of all of the cards in the first set 102. FIG. 7 illustrates the front surfaces of all of the cards in the second set 104. FIG. 8 illustrates the front surfaces of all of the cards in the first set 106. FIG. 9 illustrates the front surfaces of all of the cards in the first set 108.

The cards in the first subsets 102a, 104a, 106a and 108a all have on their front surfaces a first element common to all of the first subsets used to identify the first subsets. In the illustrated embodiment, the first element is a square. The cards in the second subsets 102b, 104b, 106b and 108b all have on their front surfaces a second element different from the first element and common to all of the second subsets used to identify the second subsets. In the illustrated embodiment, the second element is a triangle. The cards in the third subsets 102c, 104c, 106c and 108c all have on their front surfaces a third element different from the first element and the second element and common to all of the third subsets used to identify the third subsets. In the illustrated embodiment, the third element is an X. The cards in the fourth subsets 102d, 104d, 106d and 108d all have on their front surfaces a fourth element different from the first element, the second element and the third element and common to all of the fourth subsets used to identify the fourth subsets. In the illustrated embodiment, the fourth element is a circle. It will be appreciated that any suitable indicia, such as other shapes, patterns or symbols, may also be used to identify the different subsets.

In one embodiment, the elements provided on the front surface of the cards are designated to correspond to actual physical elements. For example, the square may designate an "Earth" element, the triangle may designate a "Water" element, the X may designate a "Fire" element, and the circle may designate an "Air" element.

The cards in each of the subsets are provided with different powers, preferably indicated by the number of elements provided on the front surfaces of the cards in the subset. For example, as shown in FIGS. 3-9, each subset comprises ten cards with consecutive powers numbered from one to ten, with the power or number of the card indicated by the number of elements appearing on the front surface of the cards. Within each set of cards, each of the four subsets preferably has cards with the same powers or numbering as the other subsets. For example, in set 102, subsets 102a, 102b, 102c and 102d each comprises ten cards having the same consecutive numbering from one to ten, indicated by the number of squares appearing on the front surfaces of the cards. It will be appreciated that other indicia may be utilized to indicate the power or number of a card, such as providing a number on the front surface of the card, or by character art as described below. Although the illustrated embodiment provides for ten consecutively numbered cards in each subset, it will be appreciated that a fewer or greater number of cards may be utilized in each subset, and that the numbering need not be consecutive or start with a power or number of one.

Among each set of cards, the corresponding subsets preferably have the same elements and identical powers or numbering, with only the color or other indicia being different to designate that each set of cards belongs to a different player. For example, between set 102 and set 104: subset 102a and subset 104a each comprises ten cards having the same square element and the same consecutive power or numbering from one to ten; subset 102b and subset 104b each comprises ten cards having the same triangle element and the same consecutive power or numbering from one to ten; subset 102c and subset 104c each comprise ten cards having the same X element and the same consecutive power or numbering from one to ten; and subset 102d and subset 104d each comprise ten cards having the same circle element and the same consecutive power or numbering from one to ten.

Figure 10A:
FIG. 10A illustrates surface ornamentation for a back surface used for a plurality of playing cards according to one embodiment.
Figure 10B:
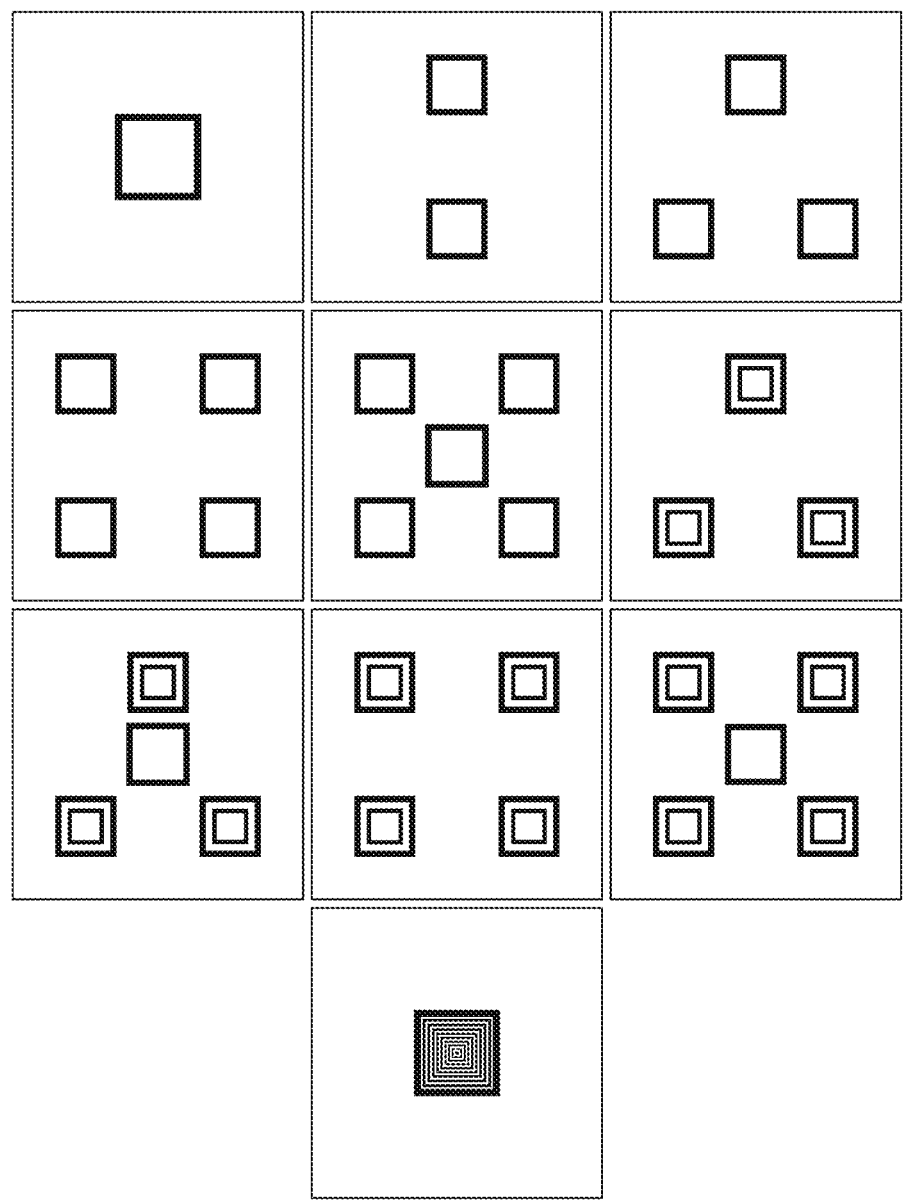
FIG. 10B illustrates surface ornamentation for the front surfaces of a first subset of playing cards, each having a common first element.
Figure 10C:
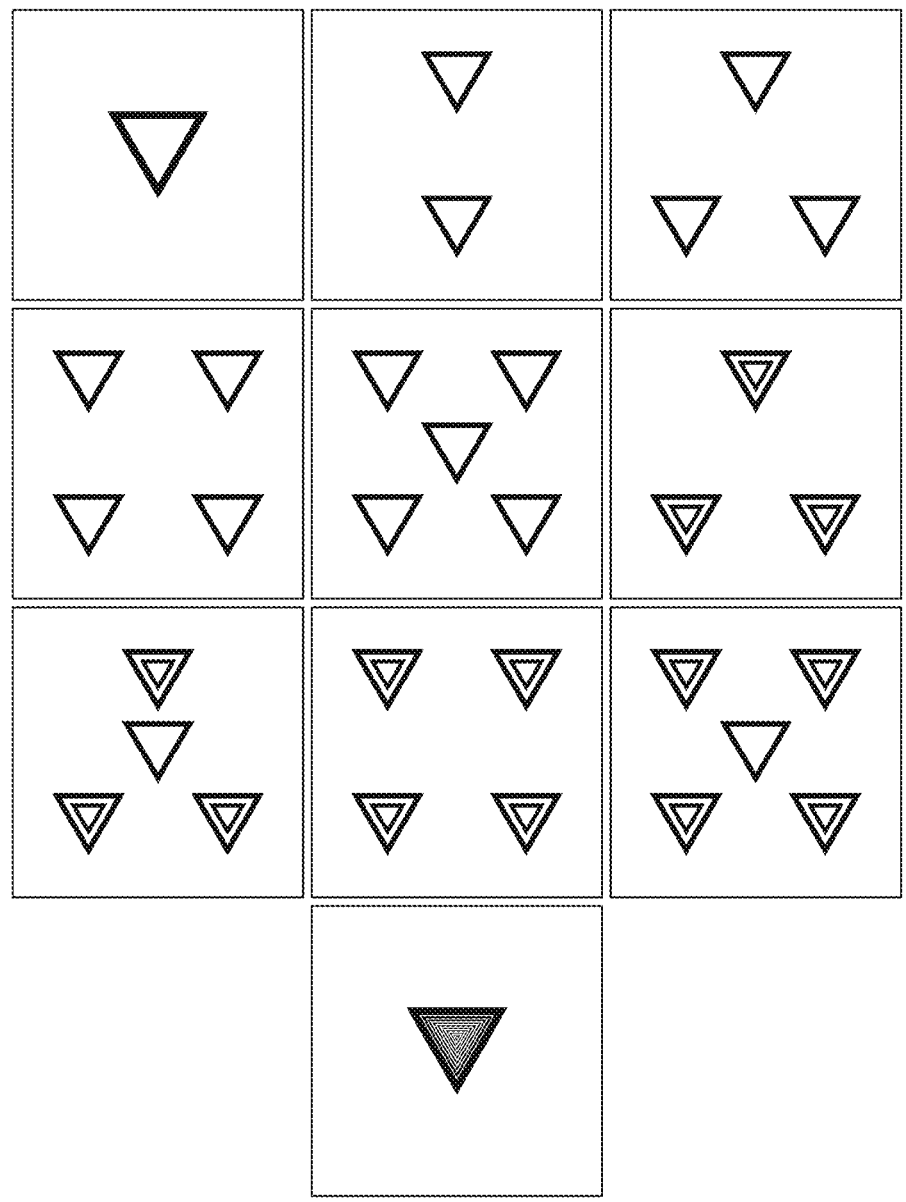
FIG. 10C illustrates surface ornamentation for the front surfaces of a second subset of playing cards, each having a common second element.
Figure 10D:
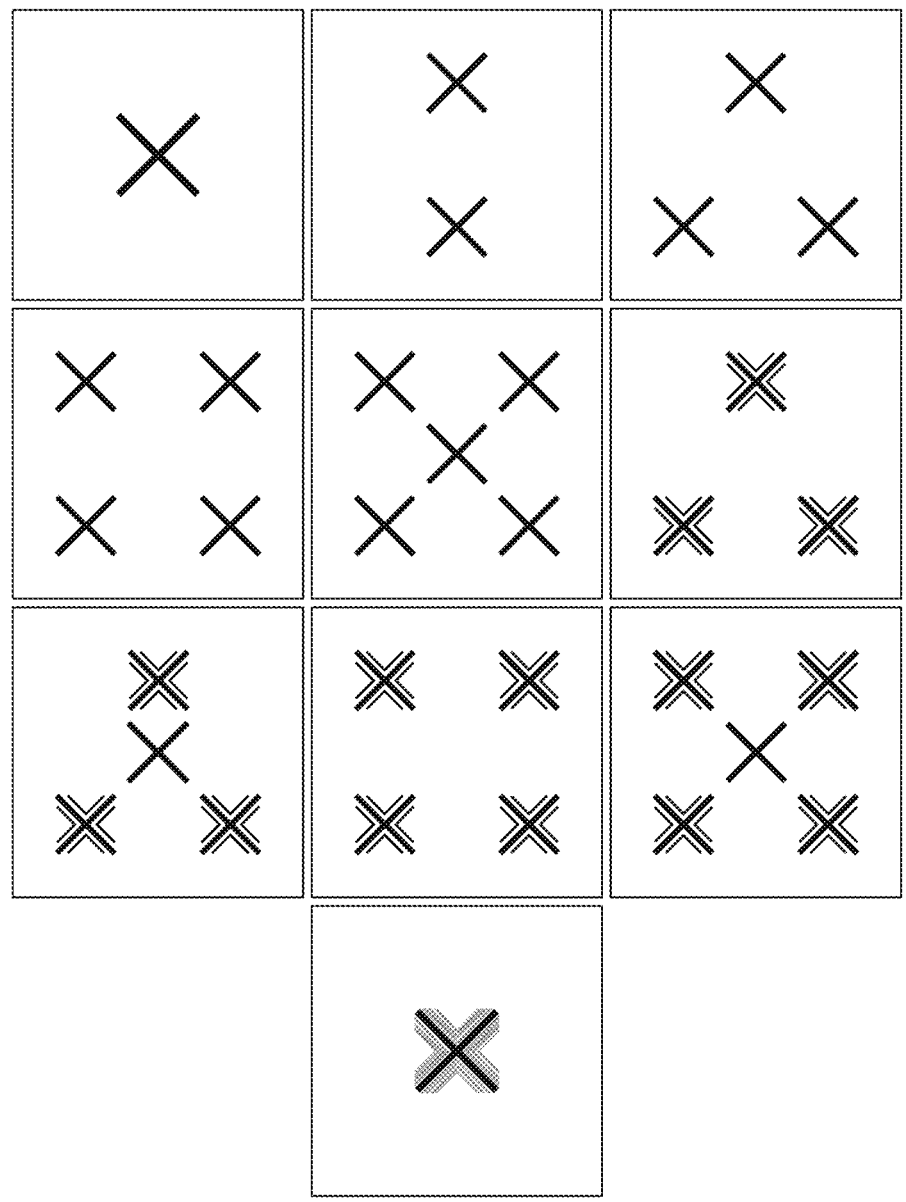
FIG. 10D illustrates surface ornamentation for the front surfaces of a third subset of playing cards, each having a common third element.
Figure 10E:
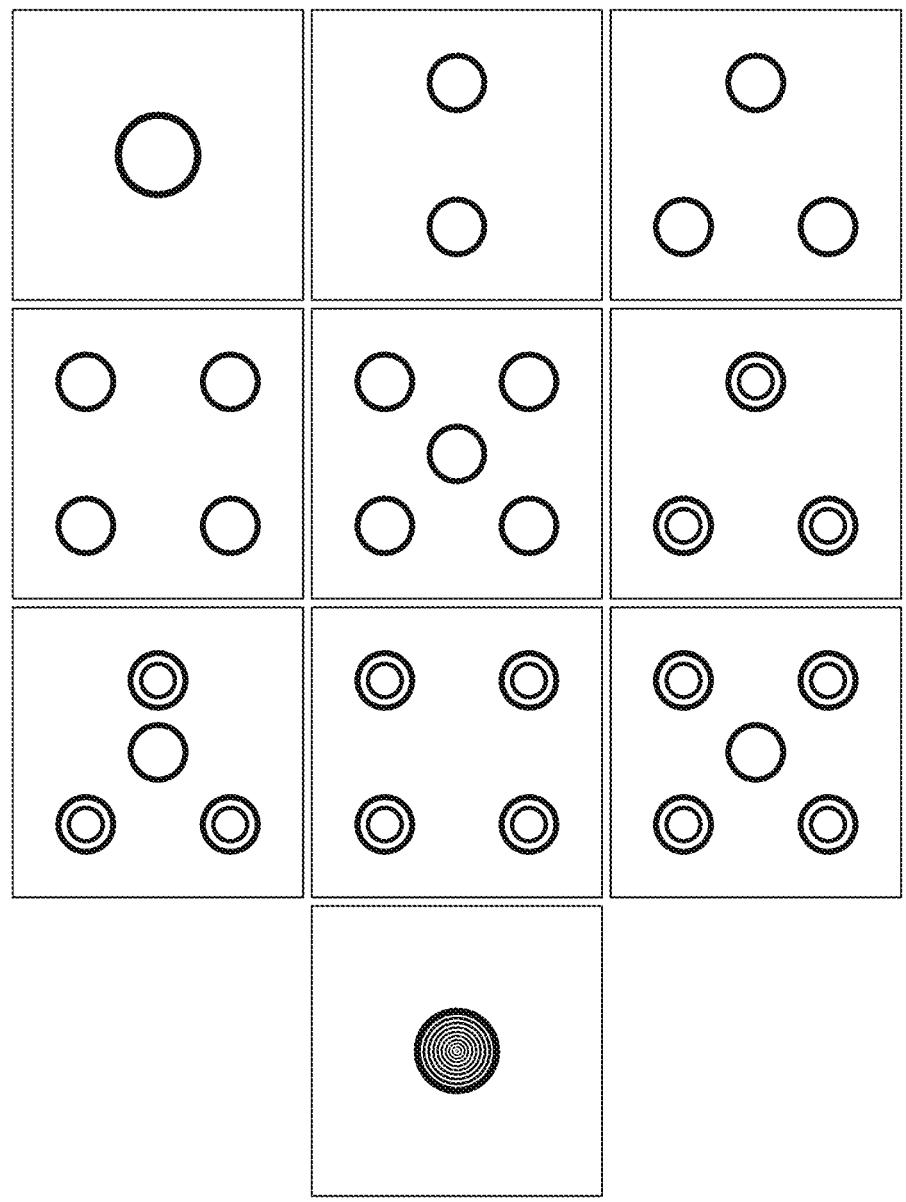
FIG. 10E illustrates surface ornamentation for the front surfaces of a fourth subset of playing cards, each having a common fourth element.

FIG. 10A illustrates an example design of the back surface of a playing card that may be used for any of the decks, sets and/or subsets described above. As described above, this design may be provided in different colors or color schemes to indicate different sets or individual decks, such as sets 102, 104, 106 and 108 described above. The design illustrated in FIG. 10A may be used as the back surface for all of the cards described below with respect to FIGS. 10B-10E. FIG. 10B illustrates an example design of the front surface of the playing cards used for the subsets 102a, 104a, 106a, and 108a described above, which may be provided in different colors or color schemes (for example with white, black, blue, or red backgrounds), and is shown having a square element. FIG. 10C illustrates an example design of the front surface of the playing cards used for the subsets 102b, 104b, 106b, and 108b described above, which may be provided in different colors or color schemes (for example with white, black, blue, or red backgrounds), and is shown having a triangle element. FIG. 10D illustrates an example design of the front surface of the playing cards used for the subsets 102c, 104c, 106c, and 108c described above, which may be provided in different colors or color schemes (for example with white, black, blue, or red backgrounds), and is shown having an X element. FIG. 10E illustrates an example design of the front surface of the playing cards used for the subsets 102d, 104d, 106d, and 108d described above, which may be provided in different colors or color schemes (for example with white, black, blue, or red backgrounds), and is shown having a circle element.

Although the deck 100 has been described as comprising four sets of cards, it will be appreciated that other decks may be utilized having fewer or greater sets of cards. For example, in a two player game a deck may comprise two sets of cards, such as set 102 and set 104, each set comprising 40 cards so that the entire deck comprises 80 cards.

Methods of Playing

Further embodiments of the application are directed to methods of playing a game utilizing the deck or decks of cards hereinbefore described. A game may be played using physical cards on any physical surface, or a game may be played electronically in a virtual environment using a virtual deck of playing cards, wherein virtual representations of cards are shown on a video display such as a computer screen, tablet or mobile device. Games may be played utilizing a video gaming system comprising a processor, a video display and player input controls. Examples of video gaming systems include desktop and laptop computers, dedicated gaming systems, tablets, mobile phones, and arcade-like or casino-like standalone units. In virtual environment embodiments, a video game application may be executed on a computing device to perform or control the steps of the method for playing the game. A computing device used to execute a video game application may be local to where a player or players are located, or may be at a central location that is connected via a network to one or more players and their own respective computing devices.

Games may be played with two or more players, and in processor-controlled embodiments of the game, one of the players may be a computer processing unit. Processor-implemented embodiments of the game may also involve players in different locations playing together over a wired or wireless network. In processor-implemented embodiments of the game, software comprising instructions for executing the rules of the game may be stored on a computer-readable medium, and the processor may be configured to execute the software or instructions to perform the steps of playing the game.

A game is played on a grid, such as an imaginary grid on a physical surface such as a table or a floor. In other embodiments, an actual grid may be provided, such as a surface having grid lines, grid markings, or borders forming the grid. In a virtual environment or a processor-implemented game, a grid may be provided by a display screen which may or may not include grid markings. When the cards utilized have a substantially square shape, the grid may comprise a plurality of squares arranged in vertical columns and horizontal rows. Cards placed on the grid form the board. The term "adjacent" as used herein, when referring to cards or spaces on a grid, means the card or space on the grid that is immediately next to another card or space, such as the next card or space in a horizontal or vertical line or row on a grid.

In one embodiment, players utilize cards from their individual sets or decks, and alternate turns with the objective being to utilize one player's cards to form two lines of four in a row on the grid. A line comprises four consecutive cards arranged either horizontally or vertically on the grid. The four cards must belong to one player, and do not count as a line if an opponent's card interrupt the four cards. In some embodiments, two lines may overlap on one card, the overlapping card being called the hinge. In preferred embodiments, lines may not be diagonal. In one embodiment of playing a game, all cards in play must be connected to another card by sharing at least one full side, and therefore in an adjacent grid space. Furthermore, by extension all cards in play must somehow be connected to each other, so that the board they create is in one piece, and is unified. If the board is ever in more than one piece the board is called broken. In some embodiments, any action that breaks the board is an illegal action.

In some embodiments, cards are placed on the grid with the back surfaces up, and each player alternates turns by placing a card on the grid. In other embodiments, a game is played with cards being placed on the grid with the front surfaces placed face up. In such an embodiment, an objective of the game may be to form two "strings," where a string is defined as a horizontal or vertical line made up of the same player's cards, and the cards of each string contain four different elements, with a different element appearing on the front surface of each card of the string. For example, a string may comprise four cards all having blue print on a white background, one of the cards having the first element, one of the cards having the second element, one of the cards having the third element, and one of the cards having the fourth element. For such a string, the power of the cards does not matter.

In some embodiments, the element provided on a card can be utilized to designate the number of spaces an already placed card can move on the grid. For example, a square element may indicate a move of one space, a triangle element may indicate a move of up to two spaces, an X element may indicate a move of up to three spaces, and a circle element may indicate a move of up to four spaces. In game embodiments in which moves are permitted, cards may move from one grid space to an adjacent grid space, horizontally or vertically, and may only move through open spaces on the grid, unoccupied by other cards. In some embodiments, while moving, a card may become completely disconnected from the board, but the card must become reconnected by the end of the move.

In further embodiments, game play may involve attacking an opponent's cards. To attack an opponent's cards, a player's card must have a higher power than the card being attacked. An attacking card is a card on a space in the grid adjacent to an opponent's cards, where the attacking card has a higher power than the adjacent card. In some embodiments, the lowest powered card (such as a card with a power of one) may be designated to be a stronger card than the highest powered card (such as a card with a power of ten). In such an embodiment, a one may attack a ten, but a ten may not attack a one.

When an attack is performed, the attacked card is removed from the grid and the attacking card assumes the space of the attacked card. If the attacking card and the attacked card have the same power, in some embodiments the elements of the cards are compared to determine which card is stronger. In some embodiments, the Earth square element is designated to be stronger than the Water triangle element, the Water triangle element is designated to be stronger than the Fire X element, and the Fire X element is designated to be stronger than the Air circle element. If two cards have the same power and element, either may attack each other, but both cards are removed from the grid and are annihilated. In other embodiments, the elements are not compared and cards of the same power are annihilated.

In some embodiments, the number of actions that a player may take in his or her turn is determined by currency (referred herein also as "Joules"). For example, each player may be given a number of units of currency per turn, with certain actions utilizing a number of units of currency. For example, placing cards onto the grid may cost a player a certain number of units, moving cards already placed on the grid may cost a player a certain number of units, and attacking an opponent's card with a card already placed on the grid may cost a player a certain number of units. In one example, each player may have five Joules per turn, and placing a card costs two Joules, moving a card up to its single-move-limit costs 1 Joule and attacking a card costs 2 Joules.

In some embodiments, game play begins with each player forming a matrix on the grid using cards from his or her shuffled set of cards. In a two player game, each player places two cards front surface face up in opposite corners of a 2×2 matrix. In a three player game, a 3×3 matrix is formed with each player placing three cards front surface face up in the 3×3 matrix, and in a four player game, a 4×4 matrix is formed with each player placing four cards front surface face up in the 4×4 matrix. After formation of the matrix, players alternate turns using cards from their individual sets of cards. In some game embodiments, after formation of the matrix, players draw cards from their individual sets to form hands that contain the only cards that may be utilized on that player's turn. For example, a hand may consist of four cards that a player may utilize on his or her turn. After a player takes a turn using one or more cards from the hand, the player may draw additional cards from the player's set to return the hand to four cards.

Game play involving more than two players may involve different end game objectives than a two player game. For example, in an embodiment of a three-player game, the winner must end their turn with three completed strings, and in an embodiment of a four-player game, the winner must end their turn with four completed strings. Three or more player games may also utilize a different number of units of currency provided per turn.

Examples

Further details of game play are explained in the non-limiting examples of different levels for a game called Strings, described further below.

Figure 11:
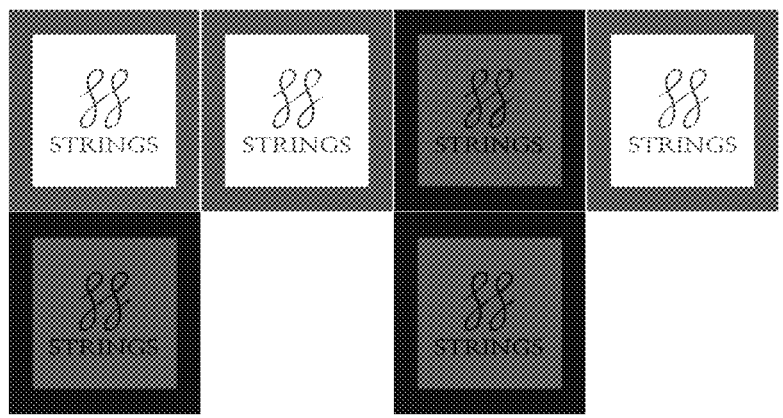
FIGS. 11-38 illustrate arrangements of cards during examples of game play.
Figure 12:
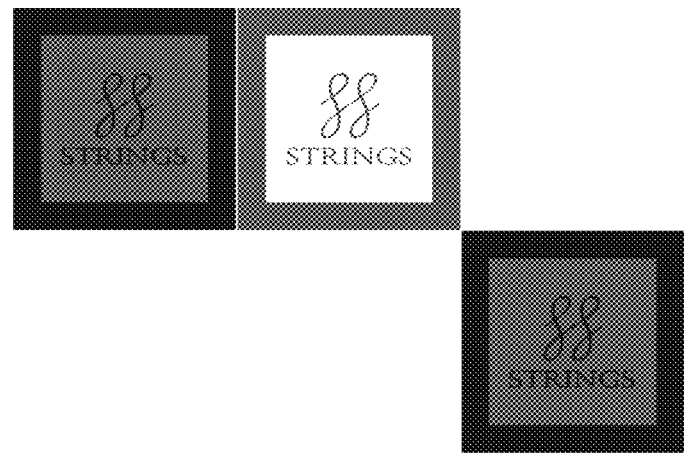
Figure 13:
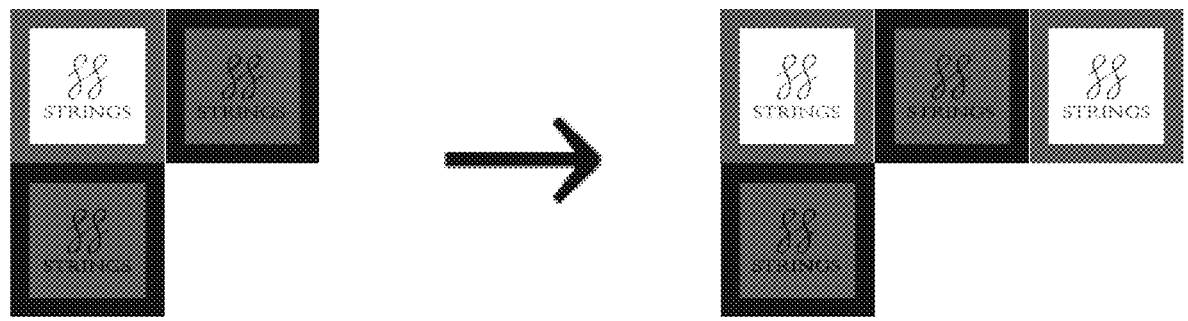
Figure 14:
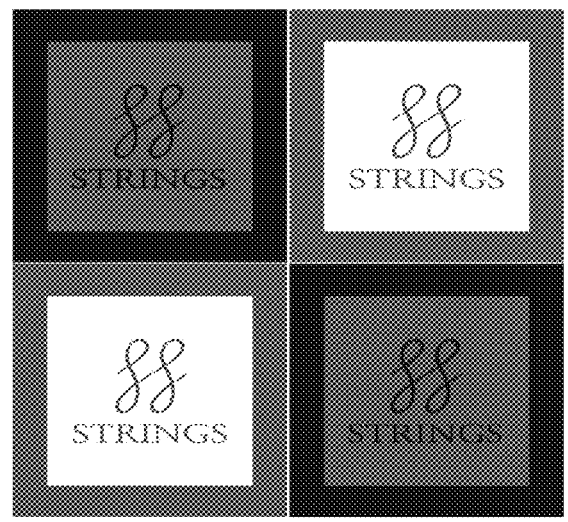
Figure 15:
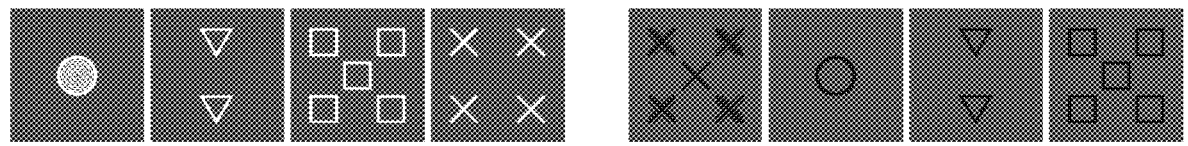
Figure 16:
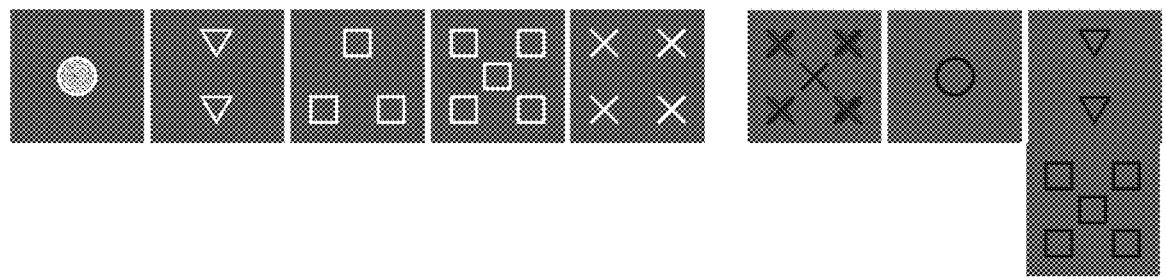

Level 1—Beginner
Objective
  End your turn with two lines of four of your own cards.
  In Level 1, you play with the Strings logo face up.
  What counts as a line?
  A line must be horizontal or vertical of four and of only your cards.
  Two lines may overlap on one card, called the hinge.
Fundamentals
The Grid
  There is no board in Strings. The game is played on an imaginary square grid in front of you. Cards may only occupy spaces that make up squares in the grid.
Unity
  All cards in play must be connected to another card by sharing at least one side, therefore in an adjacent grid space. Furthermore, in this way all cards in play must somehow be connected to each other, so that the board they create is in one piece—unified.
  If the board is ever in more than one piece the board is broken. Any action that breaks the board is an illegal action.
    Example (see FIG. 11): This board is unified.
    Example (see FIG. 12): This board is broken.
Actions: Placing
  You may place cards from your deck onto any free space on the grid that is not occupied by another card. Each card you place must connect to an existing card from the board on at least one full side.
    Example (see FIG. 13): Player using white deck places one card.
Gameplay
Set Up
  The game begins by taking the top two cards from your decks and placing them into a 2×2 square with each player's cards on opposite corners.
    Example (see FIG. 14)
Playing
  Choose a player to take the first turn.
  The player who begins the game places one card. On every turn after both players place two cards per turn.
  Pick up two cards from your deck at the completion of each turn. (Except after the very first turn, in which the player only needs one card to return her hand to 4.)
  Continue alternating turns until a player creates two lines to win the game.
Endgame
  As the game progresses and you move through your deck, you may run out of cards before either player wins. In Level 1, the game would end in a draw—try again!
Level 2—Intermediate
Objective
  End your turn with two completed Strings to win the game.
  What is a String?
  A String is a horizontal or vertical line made up of four of your cards that contains a card for each of the four different elements.
    The order of the elements does not matter.
    The power of the card does not matter.
    Two Strings may overlap on one card, called the hinge.
    Example (see FIG. 15): These are Strings.
    Example (see FIG. 16): These are not Strings.
The Cards
  Each person plays with a colored deck, which each contain the same forty cards.
  Each card in a deck is uniquely determined by its element and its power.

Figure 17:
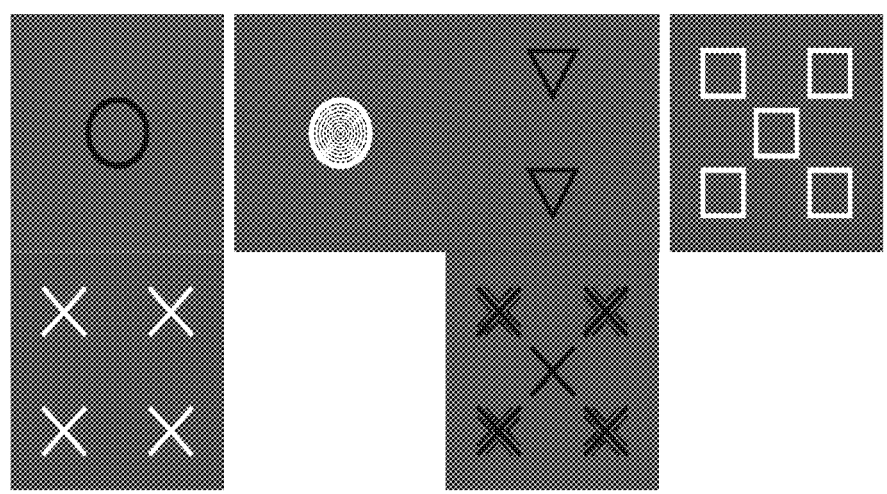
Figure 18:
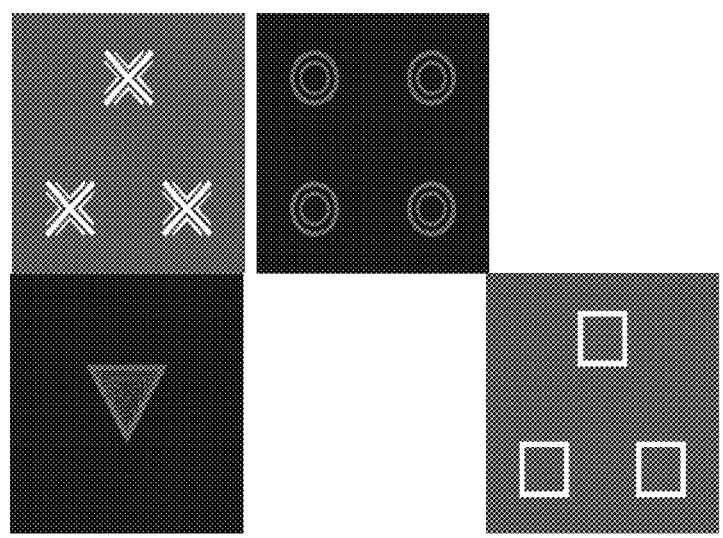
Figure 19:
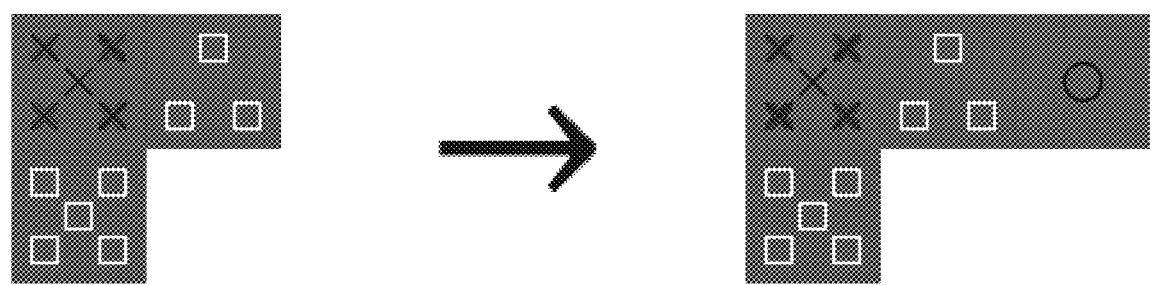
Figure 20:
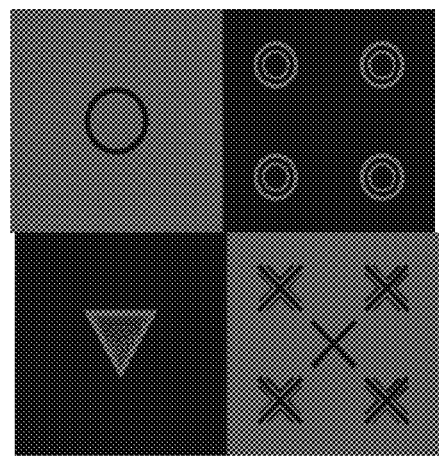
Figure 21:
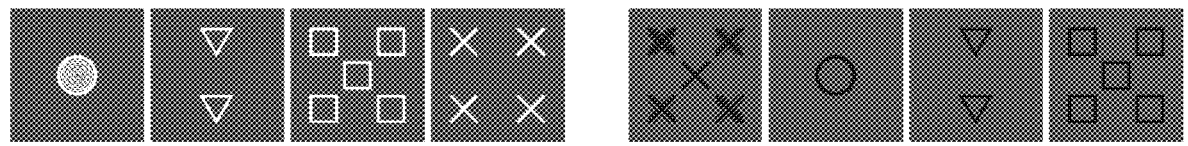
Figure 22:
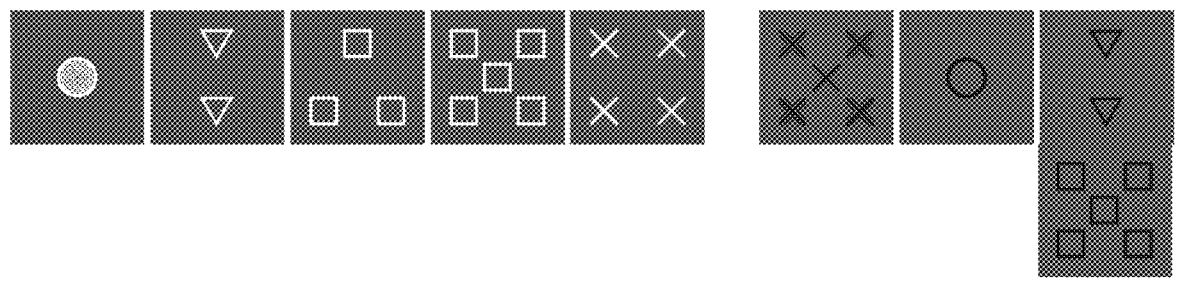

The four elements are:
  Air: Ω
  Fire: X
  Water: ∇
  Earth: □
  The arrangement of shapes on the card determines the card's power from 1 to ten, and will come into play in Level 4.
Fundamentals
The Grid
  There is no board in Strings. The game is played on an imaginary square grid in front of you.
  Cards may only occupy spaces that make up squares in the grid.
Unity
  All cards in play must be connected to another card by sharing at least one side, therefore in an adjacent grid space. Furthermore, in this way all cards in play must somehow be connected to each other, so that the board they create is in one piece—unified.
  If the board is ever in more than one piece the board is broken. Any action that breaks the board is an illegal action.
    Example (see FIG. 17): This board is unified.
    Example (see FIG. 18): This board is broken.
Actions: Placing
  You may place cards from your deck onto any free space on the grid that is not occupied by another card. Each card you place must connect to an existing card from the board on at least one full side.
    Example (see FIG. 19): Player using the red deck places a red Air card onto the board.
Gameplay
Set Up
  Shuffle your cards. The game begins by taking your top two cards and placing them into a 2×2 square with each player's cards on opposite corners.
    Example (see FIG. 20)
Playing
  Choose a player to take the first turn.
  The player who begins the game places one card. On every turn after both players place two cards per turn.
  Pick up two cards from your deck at the completion of each turn. (Except after the very first turn, in which the player only needs one card to return her hand to 4.)
  Continue alternating turns until a player creates two strings to win the game.
Endgame
  As the game progresses and you move through your deck, you may run out of cards before either player wins. In Level 2, the game would end in a draw—try again!
Level 3—Advanced
Objective
  End your turn with two completed Strings to win the game.
  What is a String?
  A String is a horizontal or vertical line made up of four of your cards that contains a card for each of the four different elements.
    The order of the elements does not matter.
    The power of the card does not matter.
    Two Strings may overlap on one card, called the hinge.
    Example (see FIG. 21): These are Strings.
    Example (see FIG. 22): These are not Strings.
The Cards
  Each person plays with a colored deck, which each contain the same forty cards.

Each card in a deck is uniquely determined by its element and its power.

The four elements are:

Air: ○

Fire: X

Water: ∇

Earth: □

The arrangement of shapes on the card determines the card's power from 1 to ten, and will come into play in Level 4.

Fundamentals

The Grid

There is no board in Strings. The game is played on an imaginary square grid in front of you.

Cards may only occupy spaces that make up squares in the grid.

Unity

All cards in play must be connected to another card by sharing at least one side, therefore in an adjacent grid space. Furthermore, in this way all cards in play must somehow be connected to each other, so that the board they create is in one piece—unified.

If the board is ever in more than one piece the board is broken. Any action that breaks the board is an illegal action.

Figure 23:
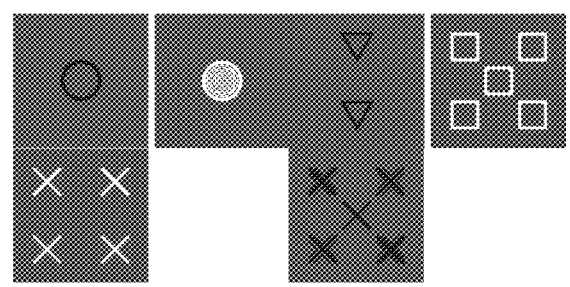

Example (see FIG. 23): This board is unified.

Figure 24:
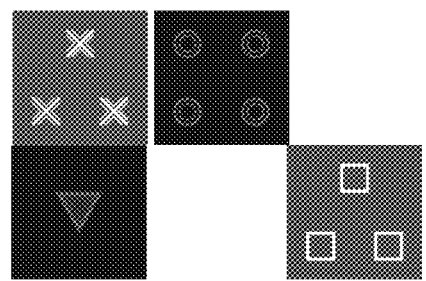

Example (see FIG. 24): This board is broken.

Actions

Actions: Placing

You may place cards from your deck onto any free space on the grid that is not occupied by another card. Each card you place must connect to an existing card from the board on at least one full side.

Figure 25:
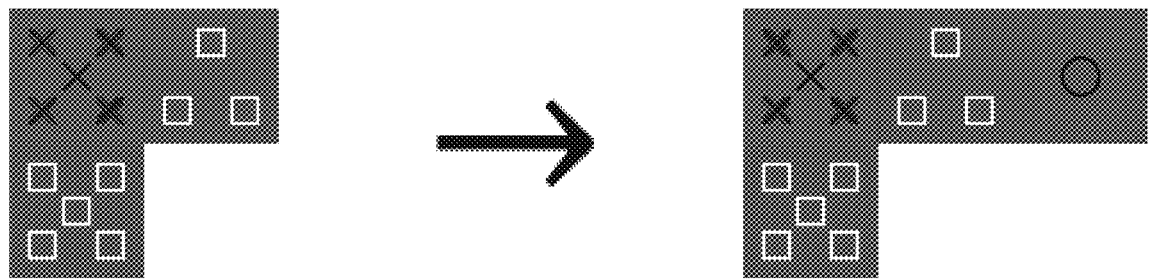

Example (see FIG. 25): Player using the red deck places a red Air card onto the board.

Actions: Moving

You may move your cards on the board to different locations on the grid.

Cards move from gird space to adjacent grid space, horizontally or vertically.

Cards may only move through open space, unoccupied by other cards.

While moving, a card may become completely disconnected from the board, however it must become reconnected by the end of that move.

The distance a card may move in one action is determined solely by its element:

Air: Ω—Up to 4 spaces

Fire: X—Up to 3 spaces

Water: ∇—Up to 2 spaces

Earth: □–1 space

Figure 26:
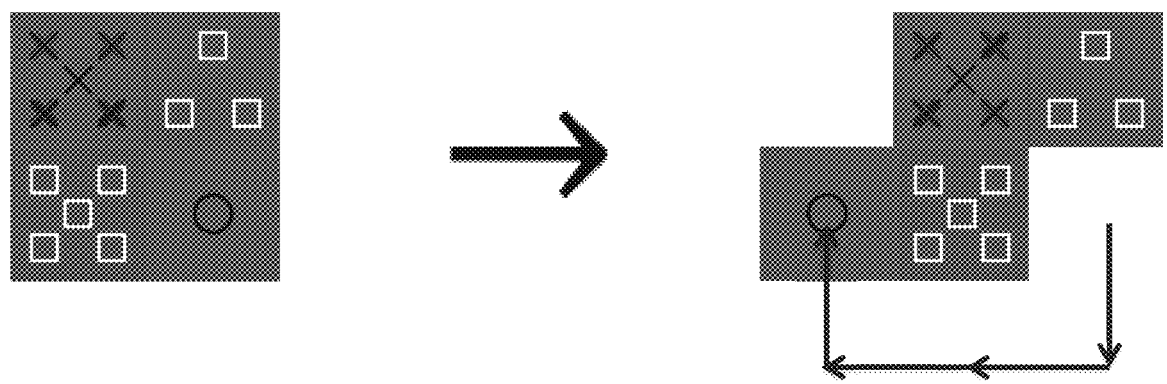

Example (see FIG. 26): An Air card moves four spaces across open grid space.

Gameplay

Set Up

Shuffle your cards. The game begins by taking your top two cards and placing them into a 2×2 square with each player's cards on opposite corners.

Figure 27:
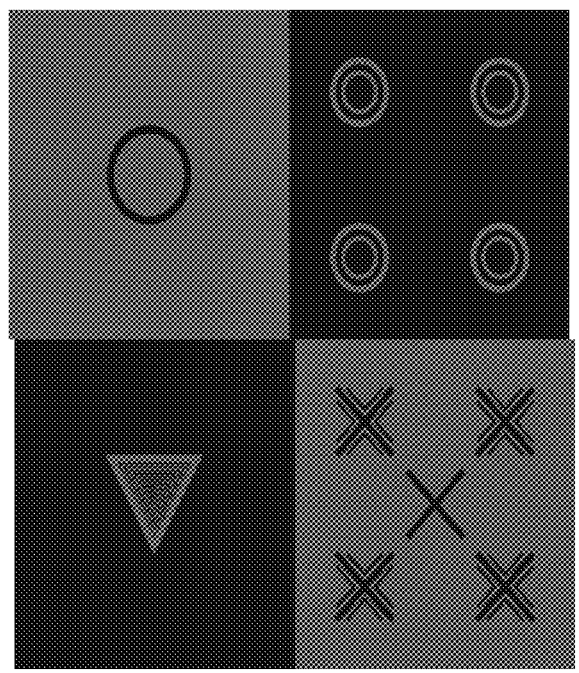

Example (see FIG. 27)

Joules

Joules determine what you are allowed to do during one turn. Each action described costs you Joules. You may do absolutely any combination of actions that you can afford that do not break the board.

Playing

Choose a player to take the first turn.

The player who begins the game receives 3 Joules, however on every subsequent turn both players may use up to 5 Joules per turn.

Placing a card costs 2 Joules.

Moving a card up to its single-move-limit costs 1 Joule.

Joules cannot be saved from turn to turn.

Continue alternating turns until a player creates two strings to win the game.

Endgame

As the game progresses and you move through your deck, you may run out of cards before either player wins. You may continue by solely moving your cards on each turn until a player makes two strings to win the game.

Level 4—Strings

Objective

End your turn with two completed Strings to win the game.

What is a String?

A String is a horizontal or vertical line made up of four of your cards that contains a card for each of the four different elements.

The order of the elements does not matter.

The power of the card does not matter.

Two Strings may overlap on one card, called the hinge.

Figure 28:
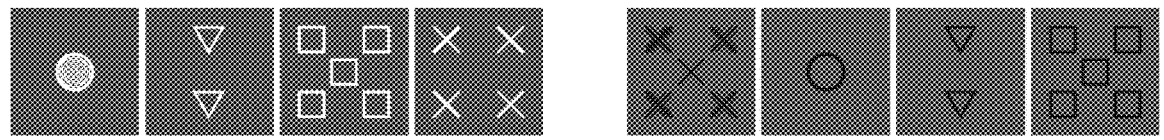

Example (see FIG. 28): These are Strings.

Figure 29:
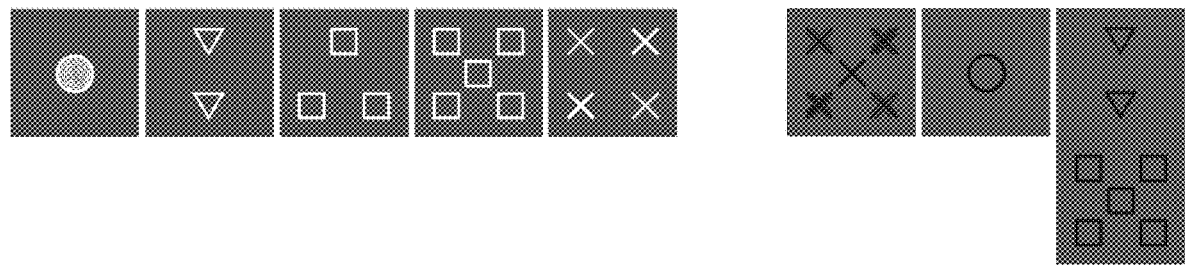

Example (see FIG. 29): These are not Strings.

The Cards

Each person plays with a colored deck, which each contain the same forty cards.

Each card in a deck is uniquely determined by its element and its power.

The four elements are:

Air: Ω

Fire: X

Water: ∇

Earth: □

The arrangement of shapes on the card determines the card's power from 1 to 10

Figure 30:
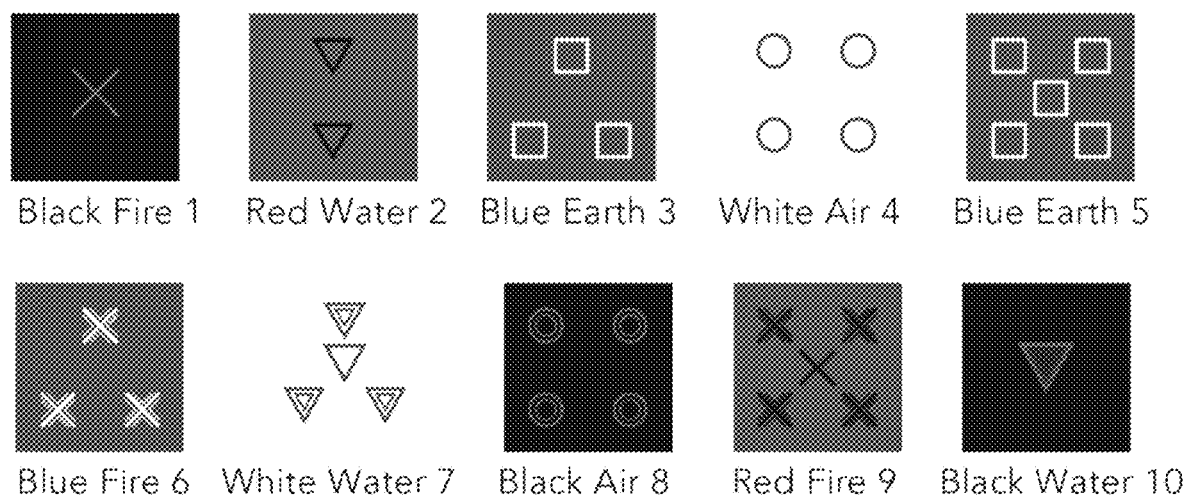

Example (see FIG. 30)

Fundamentals

The Grid

There is no board in Strings. The game is played on an imaginary square grid in front of you.

Cards may only occupy spaces that make up squares in the grid.

Unity

All cards in play must be connected to another card by sharing at least one side, therefore in an adjacent grid space. Furthermore, in this way all cards in play must somehow be connected to each other, so that the board they create is in one piece—unified.

If the board is ever in more than one piece the board is broken. Any action that breaks the board is an illegal action.

Figure 31:
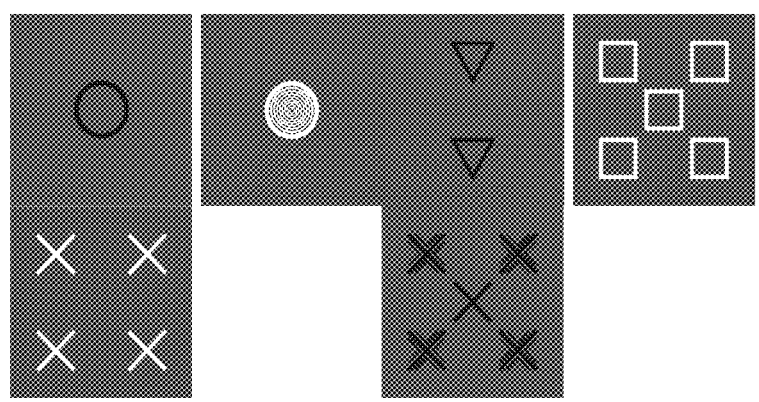

Example (see FIG. 31): This board is unified.

Figure 32:
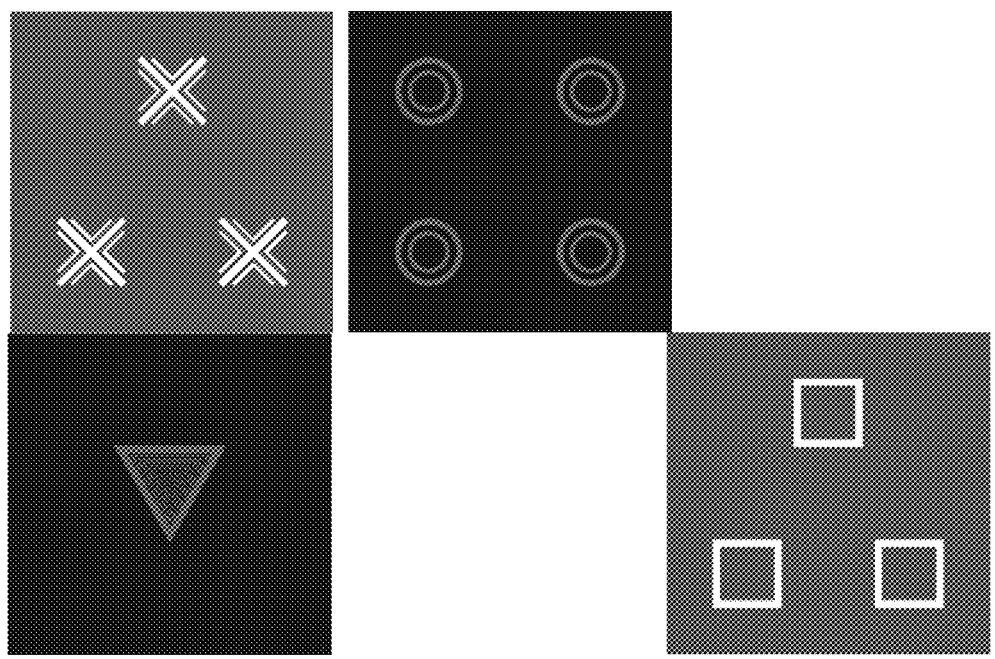

Example (see FIG. 32): This board is broken.

Actions

Actions: Placing

You may place cards from your deck onto any free space on the grid that is not occupied by another card. Each card you place must connect to an existing card from the board on at least one full side.

Figure 33:
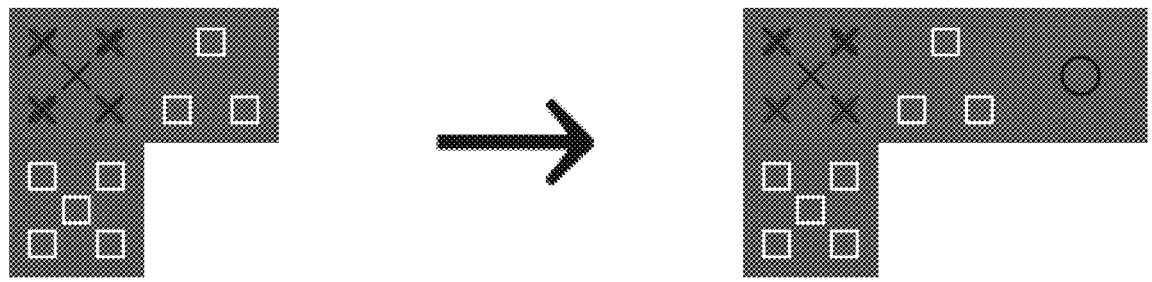

Example (see FIG. 33): Player using the red deck places a red Air card onto the board.

Actions: Moving

You may move your cards on the board to different locations on the grid.

Cards move from gird space to adjacent grid space, horizontally or vertically.

Cards may only move through open space, unoccupied by other cards.

While moving, a card may become completely disconnected from the board, however it must become reconnected by the end of that move.

Figure 34:
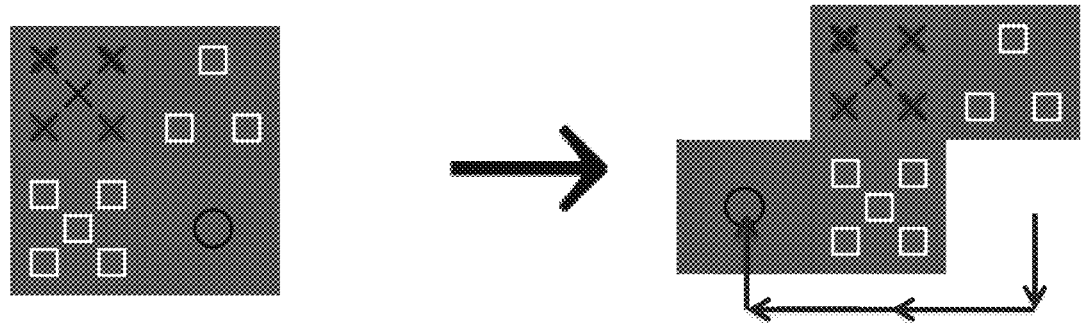

The distance a card may move in one action is determined solely by its element:

Air: Ω—Up to 4 spaces
Fire: X—Up to 3 spaces
Water: ∇—Up to 2 spaces
Earth: □—1 space Example (see FIG. 34): An Air card moves four spaces across open grid space.

Actions: Attacking

To attack an opponent's card, your card must have a higher power.

If two cards are of the same power, their element determines which is stronger:

Earth□>Water ∇>Fire X>Air ○

If two cards have both the same power and element, either may attack the other, however both cards are removed from the game and annihilate each other.

Though Tens are the strongest cards and Ones are the weakest, a One may attack a Ten, and a Ten may not attack a One.

For an attack to be permitted, your attacking card must be on the grid next to it.

To complete the action, remove and discard your opponent's card and move your attacking card into the space that it occupied.

Conservation: Between the end of one turn and the beginning of your next, you may only have as many of your cards removed from the board as you can replace in your next turn. See below notes on Endgame and Multiplayer, where conservation is most important.

Figure 35:
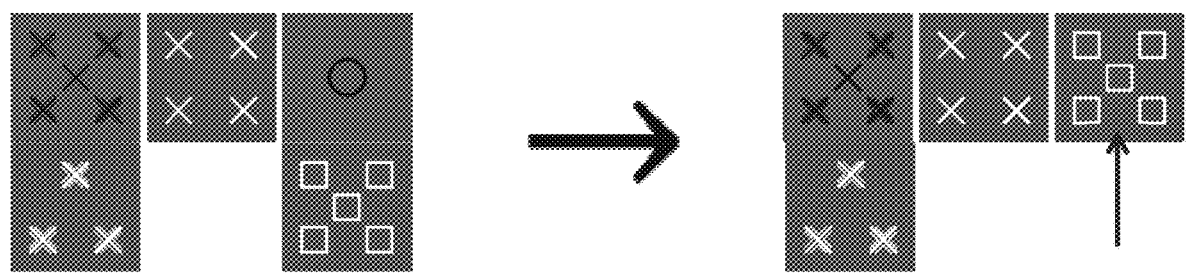

Example (see FIG. 35): Blue Earth 5 attacks Red Air 1, taking its spot and removing it from the game.

Gameplay

Set Up

Shuffle your cards. The game begins by taking your top two cards and placing them into a 2×2 square with each player's cards on opposite corners.

Figure 36:
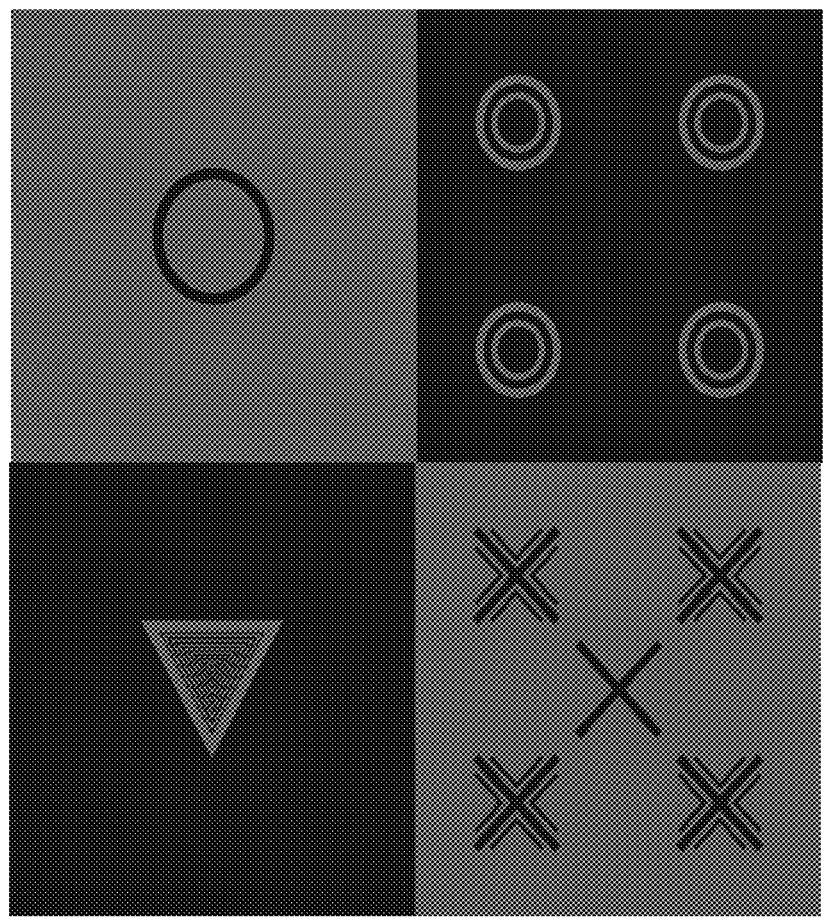

Example (see FIG. 36):

The player that starts is whoever has the most to lose by not starting.

In the example, Red may lose their Fire 9 if attacked by the Black Water 10, however, Black may lose their Water 10 if attacked by the Red Air 1. Therefore, Black would start, because they potentially have the most to lose.

Joules

Joules determine what you are allowed to do during one turn. Each action described costs you Joules. You may do absolutely any combination of actions that you can afford that do not break the board.

Playing

Each player begins each turn with a hand of four cards.

The player who begins the game receives 3 Joules, however on every subsequent turn both players may use up to 5 Joules per turn.

Placing a card costs 2 Joules.
Moving a card up to its single-move-limit costs 1 Joule.
Attacking a card costs 2 Joules.
Joules cannot be saved from turn to turn.

Your turn ends by replenishing your hand back to four cards from your shuffled deck, which is always placed face down. Continue alternating turns until a player creates two strings to win the game.

Endgame

As the game progresses and you move through your deck, you may run out of cards before either player wins. Two important considerations come into effect.

Conservation in Endgame

The rule of conservation in attacking states that a player may only have as many cards taken from them as they are capable of replacing in their next turn. Therefore, when a player runs out of cards, they may not have any of their cards from the board attacked, as they cannot replenish any cards lost to attacks.

Example: If a player has only one card left in their hand, you may only attack one of their cards during that turn cycle.

Annihilation in Endgame: If both players have run out of cards, they may not attack one another, except in the case that the attack is between two of the same cards and they are both removed.

Greatest Order

In the case that you have run out of cards, and your opponent has attacked and removed all your cards of a specific element, your win condition changes. The rule of Greatest Order states that you must incorporate as many cards as possible into your two Strings in order to win the game. Hinges are counted twice.

Example: If you have only one Air card left, this Air card must be the hinge of two full Strings. This counts as eight cards incorporated.

Example: If your opponent has taken every one of your Fire cards, you must make two Strings consisting of Air, Water, and Earth cards, such that 6 cards are incorporated.

Multiplayer

In Level 4, games can have three or four players.

Note, due to the increased complexity resulting from added players, we suggest taking time to familiarize yourself with two-player games before trying out multiplayer games. Multiplayer games have the following amendments:

Joules in Multiplayer:

For the first turn in a three-player game, the first player receives 3 Joules, the second player receives 5, and on every turn after that each player receives 7 Joules.

To start a four-player game, the order proceeds 3, 5, 7, and 9 for the rest of the game.

Winning in Multiplayer:

In Multiplayer games, more completed Strings are required to end the game.

In a three player game, the winner must end their turn with 3 completed Strings.

In a four-player game, the winner must end their turn with 4 completed Strings.

Note: Games can be made shorter by requiring fewer Strings to win, but they may end faster than you expect, thanks to the large number of Joules.

Conservation in Multiplayer:

As stated above, you can only lose as many cards between the end of your turn and the start of your next as you can replace. Therefore, the number of cards an opponent may take from you is dependent on what you have already lost during that turn cycle.

Example: In a four-player game, if Opponent 1 attacks one of your cards, and Opponent 2 attacks three of your cards, then Opponent 3 may take none, because you are only capable of replenishing 4 of your own cards on your next turn.

Setup in Multiplayer:

In multiplayer games, the starting boards differ. Furthermore, unlike in two-player games where the relative placement of cards on the starting board is unimportant, make the starting board with the Strings logo face up, and then flip the cards to begin the game.

As before, the player with the most to lose takes the first turn. Proceed clockwise.

Figure 37:
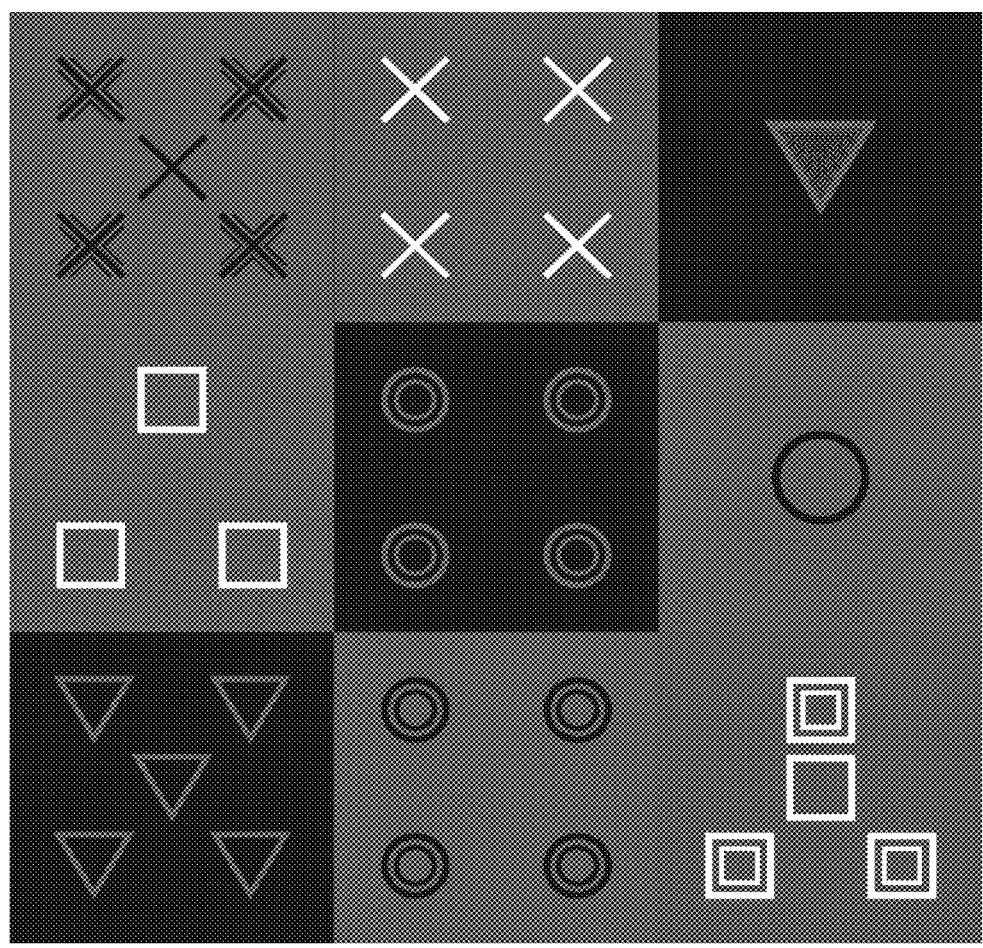
Figure 38:
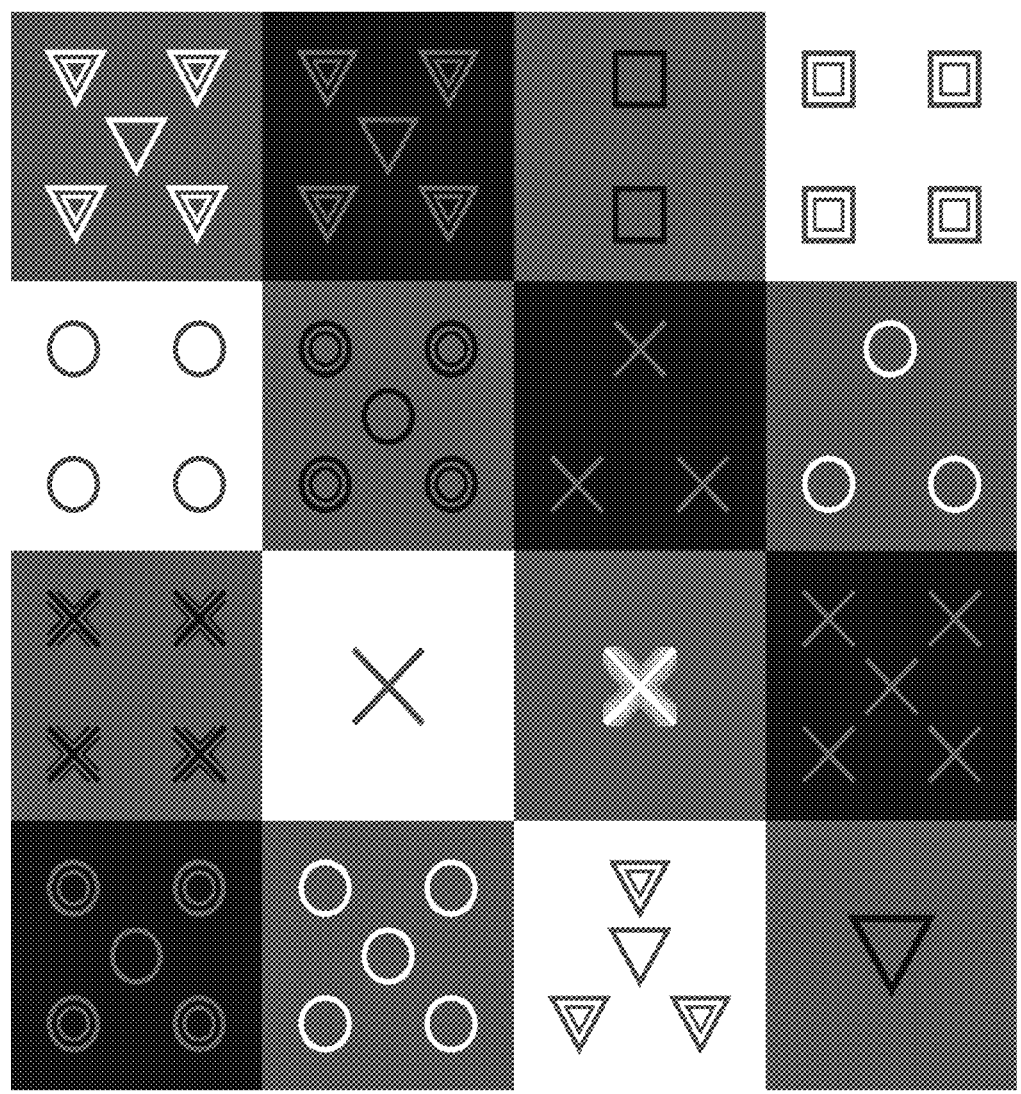

Example (see FIG. 37): A three-player starting board.
Example (see FIG. 38): A four-player starting board.

Character Art, Deck Building and Other Embodiments

In further embodiments, the cards described above can additionally include character art. For example, the front surface of a card may further include a character that represents the power of the card. In a fantasy themed game, for instance, a card with a power of one might have a smaller creature on it, and a card with a power of ten might have a large creature like a dragon. Cards may still include indicia representing the elements and powers described above, and the character art on the card would have an appearance relevant to the card's properties. In some embodiments, different types of characters may themselves provide the differing elements that are common to the subsets among the different sets of cards. For any individual player's set of cards, the cards may all have a cohesive theme, and may still include a consistent color scheme to as to differentiate one player's set of cards from another player's set of cards.

In one embodiment, a deck of playing cards may consist only of the cards for a single player. In the examples above, such a deck of playing cards would have forty cards with a common or consistent color scheme. A player would buy or obtain his or her own deck of cards, and their friends would buy or obtain their own deck of cards.

In one embodiment, an individual player's deck of cards can be customized. For example, in a deck building embodiment, a player may obtain or start with an initial deck of cards (for example, less than a full set of forty cards), and build his deck by buying, using currency, exchanging or otherwise obtaining additional cards to add his individual deck. Deck building can occur using physical cards or may be applied in a virtual environment. For example, deck building can be incorporated into playing of the game, either before the game begins or during game play, wherein a step in executing the game involves buying, using currency, trading or otherwise obtaining additional cards to use in a player's hand.

Additional Embodiments

In addition to the embodiments described throughout this specification and provided in the claims at the end of this specification, the following are embodiments of a deck of playing cards and methods of playing a game also contemplated by this specification. It will be appreciated that these additional embodiments and the claims are not exhaustive, and other embodiments of the deck, the game and methods of playing are contemplated as will be apparent to a person having ordinary skill in the art.

As used in these and other embodiments, the term "similar" refers to cards that are sufficiently similar in appearance to indicate to a player that they belong to the same group of cards.

Embodiment 1

A deck of playing cards, the deck comprising:
a first plurality of cards each having a substantially square shape and a front surface and a back surface, wherein the back surface of each of the first plurality of cards has a same or similar first appearance and the front surface of each of the first plurality of cards has a same or similar first color scheme, wherein the first plurality of cards comprises:
  a first subset of cards each having on the front surface a same or similar first shape, wherein the first subset of the first plurality of cards are consecutively numbered from the number one to at least the number ten with indicia on the front surface of the first subset of the first plurality of cards provided by the number of the same or similar first shapes provided on the front surface;
  a second subset of cards each having on the front surface a same or similar second shape different from the first shape, wherein the second subset of the first plurality of cards are consecutively numbered from the number one to at least the number ten with indicia on the front surface of the second subset of the first plurality of cards provided by the number of the same or similar second shapes provided on the front surface;
  a third subset of cards each having on the front surface a same or similar third shape different from the first shape and the second shape, wherein the third subset of the first plurality of cards are consecutively numbered from the number one to at least the number ten with indicia on the front surface of the third subset of the first plurality of cards provided by the number of the same or similar third shapes provided on the front surface; and
  a fourth subset of cards each having on the front surface a same or similar fourth shape different from the first shape, the second shape and the third shape, wherein the fourth subset of the first plurality of cards are consecutively numbered from the number one to at least the number ten with indicia on the front surface of the fourth subset of the first plurality of cards provided by the number of the same or similar fourth shapes provided on the front surface;
a second plurality of cards identical in number to the first plurality of cards each having a substantially square shape and a front surface and a back surface, wherein the back surface of each of the second plurality of cards has a same or similar second appearance different from the first appearance and the front surface of each of the second plurality of cards has a same or similar second color scheme different from the first color scheme, and wherein the second plurality of cards comprises:
  a first subset of cards each having on the front surface the same or similar first shape as the first subset of the first plurality of cards, wherein the first subset of the second plurality of cards are consecutively numbered from the number one to at least the number ten with indicia on the front surface of the first subset of the second plurality of cards provided by the number of the same or similar first shapes provided on the front surface;

a second subset of cards each having on the front surface the same or similar second shape as the second subset of the first plurality of cards, wherein the second subset of the second plurality of cards are consecutively numbered from the number one to at least the number ten with indicia on the front surface of the second subset of the second plurality of cards provided by the number of the same or similar second shapes provided on the front surface;

a third subset of cards each having on the front surface the same or similar third shape as the third subset of the first plurality of cards, wherein the third subset of the second plurality of cards are consecutively numbered from the number one to at least the number ten with indicia on the front surface of the third subset of the second plurality of cards provided by the number of the same or similar third shapes provided on the front surface; and a fourth subset of cards each having on the front surface the same or similar fourth shape as the fourth subset of the first plurality of cards, wherein the fourth subset of the second plurality of cards are consecutively numbered from the number one to at least the number ten with indicia on the front surface of the fourth subset of the second plurality of cards provided by the number of the same or similar fourth shapes provided on the front surface;

a third plurality of cards identical in number to the first plurality of cards and the second plurality of cards each having a substantially square shape and a front surface and a back surface, wherein the back surface of each of the third plurality of cards has a same or similar third appearance different from the first appearance and the second appearance, and the front surface of each of the third plurality of cards has a same or similar third color scheme different from the first color scheme and the second color scheme, and wherein the third plurality of cards comprises:

a first subset of cards each having on the front surface the same or similar first shape as the first subsets of the first plurality of cards and the second plurality of cards, wherein the first subset of the third plurality of cards are consecutively numbered from the number one to at least the number ten with indicia on the front surface of the first subset of the third plurality of cards provided by the number of the same or similar first shapes provided on the front surface;

a second subset of cards each having on the front surface the same or similar second shape as the second subsets of the first plurality of cards and the second plurality of cards, wherein the second subset of the third plurality of cards are consecutively numbered from the number one to at least the number ten with indicia on the front surface of the second subset of the third plurality of cards provided by the number of the same or similar second shapes provided on the front surface;

a third subset of cards each having on the front surface the same or similar third shape as the third subsets of the first plurality of cards and the second plurality of cards, wherein the third subset of the third plurality of cards are consecutively numbered from the number one to at least the number ten with indicia on the front surface of the third subset of the third plurality of cards provided by the number of the same or similar third shapes provided on the front surface; and a fourth subset of cards each having on the front surface the same or similar fourth shape as the fourth subset of the first plurality of cards and the second plurality of cards, wherein the fourth subset of the third plurality of cards are consecutively numbered from the number one to at least the number ten with indicia on the front surface of the fourth subset of the third plurality of cards provided by the number of the same or similar fourth shapes provided on the front surface; and a fourth plurality of cards identical in number to the first plurality of cards, the second plurality of cards and the third plurality of cards, each having a substantially square shape and a front surface and a back surface, wherein the back surface of each of the fourth plurality of cards has a same or similar fourth appearance different from the first appearance, the second appearance and the third appearance, and the front surface of each of the fourth plurality of cards has a same or similar fourth color scheme different from the first color scheme, the second color scheme and the third color scheme, and wherein the fourth plurality of cards comprises:

a first subset of cards each having on the front surface the same or similar first shape as the first subsets of the first plurality of cards, the second plurality of cards and the third plurality of cards, wherein the first subset of the fourth plurality of cards are consecutively numbered from the number one to at least the number ten with indicia on the front surface of the first subset of the fourth plurality of cards provided by the number of the same or similar first shapes provided on the front surface;

a second subset of cards each having on the front surface the same or similar second shape as the second subsets of the first plurality of cards, the second plurality of cards and the third plurality of cards, wherein the second subset of the fourth plurality of cards are consecutively numbered from the number one to at least the number ten with indicia on the front surface of the second subset of the fourth plurality of cards provided by the number of the same or similar second shapes provided on the front surface;

a third subset of cards each having on the front surface the same or similar third shape as the third subsets of the first plurality of cards, the second plurality of cards and the third plurality of cards, wherein the third subset of the fourth plurality of cards are consecutively numbered from the number one to at least the number ten with indicia on the front surface of the third subset of the fourth plurality of cards provided by the number of the same or similar third shapes provided on the front surface; and a fourth subset of cards each having on the front surface the same or similar fourth shape as the fourth subset of the first plurality of cards, the second plurality of cards and the third plurality of cards, wherein the fourth subset of the fourth plurality of cards are consecutively numbered from the number one to at least the number ten with indicia on the front surface of the fourth subset of the fourth plurality of cards provided by the number of the same or similar fourth shapes provided on the front surface.

Embodiment 2

A method of playing a game using the deck of playing cards of Embodiment 1.

Embodiment 3

The method of Embodiment 2, comprising alternating turns among two or more players to place cards onto a grid, wherein a winner is determined by forming two lines on the grid, wherein a line is defined by a horizontal or vertical line of four in a row of the same player's cards.

Embodiment 4

The method of Embodiment 3, comprising alternating turns among two or more players to place cards onto a grid, wherein a winner is determined by forming two lines on the grid, wherein a line is defined by a horizontal or vertical line of four in a row of the same player's cards, wherein the four cards in the horizontal or vertical line has one card from each of the four subsets.

Embodiment 5

The method of any one of Embodiments 2-4, wherein the game is played in a virtual environment executed on a computing device.

Embodiment 6

A method of playing a card game, comprising:
(a) providing a first player with a first set of cards and a second player with a second set of cards, the first set of cards having first indicia to indicate that the first set of cards belongs to the first player and the second set of cards having second indicia different from the first indicia to indicate that the second set of cards belongs to the second player;
(b) forming a two-by-two matrix on an imaginary or visible grid using two cards of the first player and two cards of the second player, wherein the two cards of the first player are placed in opposite corners of the matrix and the two cards of the second player are placed in different opposite corners of the matrix;
(c) placing one card of the first player into an empty space on the grid adjacent to one side of a card in the two-by-two matrix;
(d) placing two cards of the second player onto empty spaces on the grid, wherein each of the two cards placed by the second player is adjacent to at least one side of a card previously placed on the grid;
(e) placing two cards of the first player onto empty spaces on the grid, wherein each of the two cards placed by the first player is adjacent to at least one side of a card previously placed on the grid; and
(f) alternating steps (d) and (e) until one of the first and second players forms two lines on the grid, wherein a line is defined by a horizontal or vertical line of four in a row of the same player's cards.

Embodiment 7

The method of Embodiment 6, wherein the game is played using the deck of cards of Embodiment 1.

Embodiment 8

The method of Embodiment 6 or Embodiment 7, wherein the game is played in a virtual environment and the steps of the method are executed by a video game application on a computing device.

Embodiment 9

A method of playing a card game, comprising:
(a) providing a first player with a first set of cards and a second player with a second set of cards, the first set of cards having first indicia to indicate that the first set of cards belongs to the first player and the second set of cards having second indicia different from the first indicia to indicate that the second set of cards belongs to the second player, and wherein each card of the first set of cards and each card of the second set of cards has one of four different elements;
(b) forming a two-by-two matrix on an imaginary or visible grid using two cards of the first player and two cards of the second player, wherein the two cards of the first player are placed in opposite corners of the matrix and the two cards of the second player are placed in different opposite corners of the matrix;
(c) placing one card of the first player into an empty space on the grid adjacent to one side of a card in the two-by-two matrix;
(d) placing two cards of the second player onto empty spaces on the grid, wherein each of the two cards placed by the second player is adjacent to at least one side of a card previously placed on the grid;
(e) placing two cards of the first player onto empty spaces on the grid, wherein each of the two cards placed by the first player is adjacent to at least one side of a card previously placed on the grid; and
(f) alternating steps (d) and (e) until one of the first and second players forms two lines on the grid, wherein a line is defined by a horizontal or vertical line of four in a row of the same player's cards, wherein each of the four cards in the horizontal or vertical line has a different element.

Embodiment 10

The method of Embodiment 9, wherein the game is played using the deck of cards of Embodiment 1.

Embodiment 11

The method of Embodiment 9 or Embodiment 10, wherein the game is played in a virtual environment and the steps of the method are executed by a video game application on a computing device.

Embodiment 12

A method of playing a card game, comprising:
(a) providing a first player with a first set of cards and a second player with a second set of cards, the first set of cards having first indicia to indicate that the first set of cards belongs to the first player and the second set of cards having second indicia different from the first indicia to indicate that the second set of cards belongs to the second player, and wherein each card of the first set of cards and each card of the second set of cards has one of four different elements;

(b) forming a two-by-two matrix on an imaginary or visible grid using two cards of the first player and two cards of the second player, wherein the two cards of the first player are placed in opposite corners of the matrix and the two cards of the second player are placed in different opposite corners of the matrix;

(c) alternating turns of the first player and the second player, wherein in each player's turn, the player is provided with a number of units of currency, and the player having the turn utilizes the currency to perform one or more of:

(i) placing one or more cards of the player having the turn into an empty space or empty spaces on the grid adjacent to at least one side of a card previously placed on the grid, wherein placing each card costs the player having the turn a designated number of units of the currency; and (ii) moving one or more previously placed cards of the player having the turn a number of empty spaces on the grid, the number of empty spaces to move determined by the element included on the previously placed card, wherein after moving the previously placed card, each moved card is adjacent to at least one side of a card previously placed on the grid, wherein moving each previously placed card costs the player having the turn a designated number of units of the currency;

wherein a winner of the game is declared when one of the players forms two lines on the grid, wherein a line is defined by a horizontal or vertical line of four in a row of the same player's cards, wherein each of the four cards in the horizontal or vertical line has a different element.

Embodiment 13

The method of Embodiment 12, wherein the game is played using the deck of cards of Embodiment 1.

Embodiment 14

The method of Embodiment 12 or Embodiment 13, wherein the game is played in a virtual environment and the steps of the method are executed by a video game application on a computing device.

Embodiment 15

A method of playing a card game with n players, wherein n is greater than or equal to two, comprising:

(a) providing each player with a set of cards, wherein each player's set of cards has indicia different from indicia of every other player's set of cards to indicate which cards belong to which player, and wherein each card of each player's set of cards has one of four different elements and one of a plurality of powers;

(b) forming an n-by-n matrix on an imaginary or visible grid using n cards of each player; and (c) alternating turns among the n players, wherein in each player's turn, the player is provided with a number of units of currency, and the player having the turn utilizes the currency to perform one or more of:

(i) placing one or more of cards of the player having the turn into an empty space or empty spaces on the grid adjacent to at least one side of a card previously placed on the grid, wherein placing each card costs the player having the turn a designated number of units of the currency;

(ii) moving one or more previously placed cards of the player having the turn a number of empty spaces on the grid, the number of empty spaces to move determined by the element included on the previously placed card, wherein after moving the previously placed card, each moved card is adjacent to at least one side of a card previously placed on the grid, wherein moving each previously placed card costs the player having the turn a designated number of units of the currency; and (iii) attacking an attacked card with an attacking card, the attacked card being a card of another player previously placed on the grid, the attacking card being a card of the player having the turn previously placed on the grid and positioned adjacent to the attacked card, wherein the attacking card has either a higher power than the attacked card or, if the powers of the attacking card and the attacked card are the same, the attacking card includes an element designated to be a stronger element than the element of the attacked card, wherein the attacking card assumes the position on the grid of the attacked card and the attacked card is removed from the grid, wherein attacking each attacked card with an attacking card costs the player having the turn a designated number of units of the currency;

wherein a winner of the game is declared when one of the players forms two lines on the grid, wherein a line is defined by a horizontal or vertical line of four in a row of the same player's cards, wherein each of the four cards in the horizontal or vertical line has a different element.

Embodiment 16

The method of Embodiment 15, wherein the game is played using the deck of cards of Embodiment 1.

Embodiment 17

The method of Embodiment 15 or Embodiment 16, wherein the game is played in a virtual environment and the steps of the method are executed by a video game application on a computing device.

Embodiment A1

A deck of playing cards, the deck comprising:
a first set of cards and a second set of cards, wherein each card of the first and second sets has a front surface and a back surface, the front and back surfaces of the first set having indicia for identifying the first set and the front and back surfaces of the second set having indicia different from the indicia of the first set for identifying the second set, wherein the first and second sets each comprises:
  a first subset of cards each having on the front surface a first element for identifying the first subset and one of a plurality of different powers;
  a second subset of cards each having on the front surface a second element for identifying the second subset and one of a plurality of different powers, the plurality of different powers of the second subset being the same as the plurality of different powers of the first subset;
a third subset of cards each having on the front surface a third element for identifying the third subset and one of a plurality of different powers, the plurality of different powers of the third subset being the same as the plurality of different powers of the first and second subsets; and
a fourth subset of cards each having on the front surface a fourth element for identifying the fourth subset and one of a plurality of different powers, the plurality of different powers of the fourth subset being the same as the plurality of different powers of the first, second and third subsets;
wherein the plurality of different powers of the first, second, third and fourth subsets of the first set is the same as the plurality of different powers of the first, second, third and fourth subsets of the second set;
wherein the first element for identifying the first subset of the second set is the same as the first element for identifying the first subset of the first set;
wherein the second element for identifying the second subset of the second set is the same as the second element for identifying the second subset of the first set;
wherein the third element for identifying the third subset of the second set is the same as the third element for identifying the third subset of the first set; and
wherein the fourth element for identifying the fourth subset of the second set is the same as the fourth element for identifying the fourth subset of the first set.

Embodiment A2

The deck of Embodiment A1, wherein each of the cards of the first and second sets has a substantially square shape.

Embodiment A3

The deck of Embodiment A1, wherein the indicia on the front and back surfaces of the first set is a first color scheme and the indicia on the front and back surfaces of the second set is a second color scheme, the second color scheme being different from the first color scheme.

Embodiment A4

The deck of Embodiment A1, wherein:
the first element for identifying the first subset for all of the cards in the first set and the second set is a first shape;
the second element for identifying the second subset for all of the cards in the first set and the second set is a second shape;
the third element for identifying the third subset for all of the cards in the first set and the second set is a third shape;
the fourth for identifying the fourth subset for all of the cards in the first set and the second set is a fourth shape; and
the first, second, third and fourth shapes each being different from each other.

Embodiment A5

The deck of Embodiment A4, wherein the power of each card in the first and second sets is provided by the number of first shapes, second shapes, third shapes or fourth shapes provided on the front surfaces of each card.

Embodiment A6

The deck of Embodiment A1, wherein the plurality of different powers for each of the first, second, third and fourth subsets of each of the first and second sets is a series of consecutive numbers.

Embodiment A7

The deck of Embodiment A1, further comprising:
a third set of cards, wherein each card of the third set has a front surface and a back surface, the front and back surfaces of the third set having indicia for identifying the third set different from the indicia of the first set and different from the indicia of the second set, wherein the third set comprises:
a first subset of cards each having on the front surface:
a first element for identifying the first subset that is the same as the first element for identifying the first subset of the first set and the first subset of the second set; and
one of a plurality of different powers, the plurality of different powers of the first subset of the third set being the same as the plurality of different powers of the first subset of the first set and the first subset of the second set;
a second subset of cards each having on the front surface:
a second element for identifying the second subset that is the same as the second element for identifying the second subset of the first set and the second subset of the second set; and
one of a plurality of different powers, the plurality of different powers of the second subset of the third set being the same as the plurality of different powers of the second subset of the first set and the second subset of the second set;
a third subset of cards each having on the front surface:
a third element for identifying the third subset that is the same as the third element for identifying the third subset of the first set and the third subset of the second set; and
one of a plurality of different powers, the plurality of different powers of the third subset of the third set being the same as the plurality of different powers of the third subset of the first set and the third subset of the second set;
a fourth subset of cards each having on the front surface:
a fourth element for identifying the fourth subset that is the same as the fourth element for identifying the fourth subset of the first set and the fourth subset of the second set; and
one of a plurality of different powers, the plurality of different powers of the fourth subset of the third set being the same as the plurality of different powers of the fourth subset of the first set and the fourth subset of the second set.

Embodiment A8

The deck of Embodiment A7, further comprising:
a fourth set of cards, wherein each card of the fourth set has a front surface and a back surface, the front and back surfaces of the fourth set having indicia for identifying the fourth set different from the indicia of the first set, different from the indicia of the second set and different from the indicia of the third set, wherein the fourth set comprises:
- a first subset of cards each having on the front surface:
  - a first element for identifying the first subset that is the same as the first element for identifying the first subset of the first set, the first subset of the second set and the first subset of the third set; and
  - one of a plurality of different powers, the plurality of different powers of the first subset of the fourth set being the same as the plurality of different powers of the first subset of the first set, the first subset of the second set and the first subset of the third set;
- a second subset of cards each having on the front surface:
  - a second element for identifying the second subset that is the same as the second element for identifying the second subset of the first set, the second subset of the second set and the second subset of the third set; and
  - one of a plurality of different powers, the plurality of different powers of the second subset of the fourth set being the same as the plurality of different powers of the second subset of the first set, the second subset of the second set and the second subset of the third set;
- a third subset of cards each having on the front surface:
  - a third element for identifying the third subset that is the same as the third element for identifying the third subset of the first set, the third subset of the second set and the third subset of the third set; and
  - one of a plurality of different powers, the plurality of different powers of the third subset of the fourth set being the same as the plurality of different powers of the third subset of the first set, the third subset of the second set and the third subset of the third set;
- a fourth subset of cards each having on the front surface:
  - a fourth element for identifying the fourth subset that is the same as the fourth element for identifying the fourth subset of the first set, the fourth subset of the second set and the fourth subset of the third set; and
  - one of a plurality of different powers, the plurality of different powers of the fourth subset of the fourth set being the same as the plurality of different powers of the fourth subset of the first set, the fourth subset of the second set and the fourth subset of the third set.

Embodiment A9

A method of playing a card game with n players, wherein n is greater than or equal to two, comprising:
providing each player with a set of cards, wherein each player's set of cards has indicia different from indicia of every other player's set of cards to indicate which cards belong to which player; and
alternating turns among the n players, wherein each player's turn comprises one or more of (i) placing one or more cards of the player having the turn on an imaginary or visible grid, and (ii) moving one or more previously placed cards of the player having the turn to a different position on the grid;
wherein a winner of the game is declared when one of the players forms n or more lines on the grid, wherein a line is defined by a horizontal or vertical line of four in a row of the same player's cards.

Embodiment A10

The method of Embodiment A9, wherein placing one or more cards comprises placing a card of the player having the turn into an empty space on the grid adjacent to at least one card previously placed on the grid.

Embodiment A11

The method of Embodiment A9, further comprising, prior to alternating turns among the n players, forming an n×n matrix on the grid using n cards placed by each player.

Embodiment A12

The method of Embodiment A9, wherein each card of each player's set of cards has one of four different elements.

Embodiment A13

The method of Embodiment A12, wherein a line is further defined by each of the four cards in the horizontal or vertical line having a different element.

Embodiment A14

The method of Embodiment A12, wherein the four different elements are four different shapes.

Embodiment A15

The method of Embodiment A12, wherein moving one or more previously placed cards comprising moving a card of the player having the turn a number of empty spaces on the grid, the number of empty spaces determined by the element included on the previously placed card, wherein after moving the previously placed card, the moved card is adjacent to at least one other previously placed card.

Embodiment A16

The method of Embodiment A15, wherein a first element included on the previously placed card corresponds to a move of one empty space, a second element included on the previously placed card corresponds to a move of two empty spaces, a third element included on the previously placed card corresponds to a move of three empty spaces, and a fourth element included on the previously placed card corresponds to a move of four empty spaces.

Embodiment A17

The method of Embodiment A15, wherein moving one or more previously placed cards comprises moving a card only horizontally or vertically.

Embodiment A18

The method of Embodiment A12, wherein each card of each player's set of cards has one of a plurality of powers.

Embodiment A19

The method of Embodiment A18, wherein each player's set of cards comprises ten cards of a first element with consecutive powers from one to ten, ten cards of a second element with consecutive powers from one to ten, ten cards of a third element with consecutive powers from one to ten, and ten cards of a fourth element with consecutive powers from one to ten.

Embodiment A20

The method of Embodiment A19, wherein a card having a power of one is deemed to have a higher power than a card having a power of ten.

Embodiment A21

The method of Embodiment A18, wherein moving one or more previously placed cards comprises attacking an attacked card with an attacking card, the attacked card being a card of another player previously placed on the grid, the attacking card being a card of the player having the turn previously placed on the grid and positioned adjacent to the attacked card, wherein the attacking card has either a higher power than the attacked card or, if the powers of the attacking card and the attacked card are the same, the attacking card includes an element designated to be a stronger element than the element of the attacked card, wherein the attacking card assumes the position on the grid of the attacked card and the attacked card is removed from the grid.

Embodiment A22

The method of Embodiment A21, wherein if an attacking card has the same element and power as the attacked card, both the attacking card and the attacked card are removed from the grid.

Embodiment A23

The method of Embodiment A9, wherein for each player's turn, each player is provided with a number of units of currency.

Embodiment A24

The method of Embodiment A23, wherein placing one or more cards and/or moving one or more previously placed cards costs the player having the turn a designated number of units.

Embodiment A25

The method of Embodiment A9, wherein for each player's turn, the player utilizes a limited number of cards drawn from the player's set of cards to form the player's hand.

Embodiment A26

The method of Embodiment A9, wherein the cards are paper or tile cards.

Embodiment A27

The method of Embodiment A9, wherein the card game is played in a virtual environment and the steps of the method are executed by a video game application on a computing device.

Embodiment A28

The method of Embodiment A27, wherein one of the n players is a computer player.

Embodiment A29

The method of Embodiment A9, wherein on each player's turn, the player having the turn is provided with a subset of the set of cards to use forming the player's hand.

Embodiment A30

The method of Embodiment A29, wherein the subset consists of four cards.

Embodiment A31

The method of Embodiment A9, wherein the indicia are different colors.

Embodiment A32

The method of Embodiment A9, wherein n=2.

Embodiment A33

The method of Embodiment A9, wherein n=3.

Embodiment A34

The method of Embodiment A9, wherein n=4.

Overview of Computing Devices

The computing devices as described herein may include a dedicated game device, a smart phone, a tablet, a personal computer, a laptop, a smart television, a car console display, and the like. A computing device may include a processing unit that interacts with other components of the computing device and also external components. A media reader may be included that communicates with media. The media reader may be an optical disc reader capable of reading optical discs, such as CD-ROM or DVDs, or any other type of reader that can receive and read data from game media. In some embodiments, the media reader may be optional or omitted. For example, game content or applications may be accessed over a network. In some cases, a computing device may include multiple devices, such as one device including a central processing unit and a graphics processing unit, another device that includes a display, and another device that includes an input mechanism, such as a keyboard or mouse.

A user input/output (I/O) may be used to send and receive commands between a processing unit and user devices, such as game controllers. In some embodiments, the user I/O can include touchscreen inputs. The touchscreen can be a capacitive touchscreen, a resistive touchscreen, or other type of touchscreen technology that is configured to receive user input through tactile inputs from the user. A display I/O may provide input/output functions that are used to display images from the game being played. A network I/O may be used for input/output functions for a network. Network I/O may be used during execution of a game, such as when a game is being played online or being accessed online.

Display output signals may be produced by the display I/O and can include signals for displaying visual content on a display device, such as graphics, user interfaces, video, and/or other visual content. The computing device may comprise one or more integrated displays configured to receive display output signals produced by the display I/O, which may be output for display to a user.

The computing device can also include other features that may be used with a game, such as a clock, flash memory, and other components. An audio/video player might also be used to play a video sequence, such as a movie. It should be understood that other components may be provided in the computing device and that a person skilled in the art will appreciate other variations of the computing device.

Program code can be stored in ROM, RAM, or storage (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage, and/or on removable media such as game media (which can be a CD-ROM, cartridge, memory chip or the like, or obtained over a network or other electronic channel as needed). In general, program code can be found embodied in a tangible non-transitory signal-bearing medium.

Random access memory (RAM) (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM is volatile storage and data stored within RAM may be lost when the computing device is turned off or loses power.

As computing device reads game media and provides a game, information may be read from game media and stored in a memory device, such as RAM. Additionally, data from storage, ROM, servers accessed via a network (not shown), or removable storage media may be read and loaded into RAM. Although data is described as being found in RAM, it will be understood that data does not have to be stored in RAM and may be stored in other memory accessible to processing unit or distributed among several media, such as game media and storage.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure.

Although the present disclosure includes certain embodiments, examples and applications, it will be understood by those skilled in the art that the present disclosure extends beyond the specifically disclosed embodiments to other alternative embodiments and/or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

What is claimed is:

1. A method of playing a card game with n players, wherein n is greater than or equal to two, comprising:

providing each player with a set of cards, wherein each player's set of cards has indicia different from indicia of every other player's set of cards to indicate which cards belong to which player, and wherein each card of each player's set of cards has one of four different elements, a first element on the previously placed card corresponds to an ability to move the previously placed card one empty space on the grid, a second element included on the previously place card corresponds to an ability to move the previously placed card two empty spaces on the grid, a third element included on the previously placed card corresponds to an ability to move the previously placed card three empty spaces on the grid, and a fourth element included on the previously placed card corresponds to an ability to more the previously placed card four empty spaces on the grid; and alternating turns among the n players, wherein each player's turn comprises one or more of (i) placing one or more cards of the player having the turn on an imaginary or visible grid in a manner that visually shows the indicia and element of the one or more placed cards and indicates to all n players that the one or more placed cards belong to the player having the turn, and (ii) moving one or more previously placed cards of the player having the turn to a different position on the grid, wherein moving the one or more previously placed cards comprises moving a previously placed card of the player having the turn a number of empty spaces on the grid, the number of empty spaces determined by the element included on the previously placed card, wherein after moving the previously placed card, the moved card is adjacent to at least one other previously placed card, wherein a first element included on the previously placed card corresponds to an ability to move the previously placed card one empty space on the grid, a second element included on the previously placed card corresponds to an ability to move the previously placed card two empty spaces on the grid, a third element included on the previously placed card corresponds to an ability to move the previously placed card three empty spaces on the grid, and a fourth element included on the previously placed card corresponds to an ability to move the previously placed card four empty spaces on the grid;

wherein a winner of the game is declared when one of the players forms two or more lines on the grid, wherein a line is defined by a horizontal or vertical line of four in a row of the same player's cards and each of the four cards in a row of the same player's cards forming each line has a different element from the other cards in the line.

2. The method of claim 1, wherein placing one or more cards comprises placing a card of the player having the turn into an empty space on the grid adjacent to at least one card previously placed on the grid in a manner that visually shows the indicia and element of the one or more placed cards of the player having the turn.

3. The method of claim 1, further comprising, prior to alternating turns among the n players, forming an n×n matrix on the grid using n cards placed by each player in a manner that visually shows the indicia and element of the n cards placed by each player.

4. The method of claim 1, wherein each card of each player's set of cards has one of a plurality of powers.

5. The method of claim 4, wherein each player's set of cards comprises ten cards of a first element with consecutive powers from one to ten, ten cards of a second element with consecutive powers from one to ten, ten cards of a third element with consecutive powers from one to ten, and ten cards of a fourth element with consecutive powers from one to ten.

6. The method of claim 5, wherein a card having a power of one is deemed to have a higher power than a card having a power of ten.

7. The method of claim 4, wherein moving one or more previously placed cards comprises attacking an attacked card with an attacking card, the attacked card being a card of another player previously placed on the grid, the attacking card being a card of the player having the turn previously placed on the grid and positioned adjacent to the attacked card, wherein the attacking card has either a higher power than the attacked card or, if the powers of the attacking card and the attacked card are the same, the attacking card includes an element designated to be a stronger element than the element of the attacked card, wherein the attacking card assumes the position on the grid of the attacked card and the attacked card is removed from the grid.

8. The method of claim 7, wherein if an attacking card has the same element and power as the attacked card, both the attacking card and the attacked card are removed from the grid.

9. The method of claim 1, wherein the card game is played in a virtual environment and the steps of the method are executed by a video game application on a computing device.

10. The method of claim 9, wherein one of the n players is a computer player.

11. The method of claim 1, wherein on each player's turn, the player having the turn is provided with a subset of four cards to use forming the player's hand.

12. The method of claim 1, wherein n=2, and further comprising, prior to alternating turns among the 2 players:
forming a two-by-two matrix on the grid using two cards of a first player and two cards of a second player, wherein the two cards of the first player are placed in opposite corners of the matrix and the two cards of the second player are placed in different opposite corners of the matrix, wherein the two cards of each of the first player and the second player are selected from the respective player's set of cards, and wherein the two cards of each of the first player and the second player are placed in the matrix in a manner that visually shows to both the first and second players the indicia and element of the cards placed in the matrix and indicates which of the placed cards belong to which player;
placing one card of the first player into an empty space on the grid adjacent to one side of a card in the two-by-two matrix in a manner that visually shows the indicia and element of the one placed card of the first player; and
placing two cards of the second player onto empty spaces on the grid, wherein each of the two cards placed by the second player is adjacent to at least one side of a card previously placed on the grid in a manner that visually shows the indicia and element of the two placed cards of the second player.

13. The method of claim 1, wherein in each player's turn, the player having the turn selects whether (i) to place one or more cards of the player having the turn, (ii) to move one or more previously placed cards of the player having the turn, or (iii) to both place one or more cards of the player having the turn and to move one or more previously placed cards of the player having the turn.

14. A method of playing a card game, comprising:
(a) providing a first player with a first set of cards and a second player with a second set of cards,
wherein each card of the first set of cards has a substantially square shape, a front surface, and a back surface, wherein the back surface of each card of the first set of cards has a same or similar first appearance and the front surface of each card of the first set of cards has a same or similar first color scheme to indicate that the first set of cards belongs to the first player, wherein the first set of cards comprises:
a first subset of cards each having on the front surface a same or similar first shape, wherein the first subset of the first set of cards are consecutively numbered from the number one to at least the number ten with numerical indicia on the front surface of the first subset of the first set of cards;
a second subset of cards each having on the front surface a same or similar second shape different from the first shape, wherein the second subset of the first set of cards are consecutively numbered from the number one to at least the number ten with numerical indicia on the front surface of the second subset of the first set of cards;
a third subset of cards each having on the front surface a same or similar third shape different from the first shape and the second shape, wherein the third subset of the first set of cards are consecutively numbered from the number one to at least the number ten with numerical indicia on the front surface of the third subset of the first set of cards; and
a fourth subset of cards each having on the front surface a same or similar fourth shape different from the first shape, the second shape and the third shape, wherein the fourth subset of the first set of cards are consecutively numbered from the number one to at least the number ten with numerical indicia on the front surface of the fourth subset of the first set of cards;
wherein the second set of cards is identical in number to the first set of cards and each card of the second set of cards has a substantially square shape, a front surface, and a back surface, wherein the back surface of each card of the second set of cards has a same or similar second appearance different from the first appearance and the front surface of each card of the second set of cards has a same or similar second color scheme different from the first color scheme to indicate that the second set of cards belongs to the second player, wherein the second set of cards comprises:
- a first subset of cards each having on the front surface the same or similar first shape as the first subset of the first set of cards, wherein the first subset of the second set of cards are consecutively numbered from the number one to at least the number ten with numerical indicia on the front surface of the first subset of the second set of cards;
- a second subset of cards each having on the front surface the same or similar second shape as the second subset of the first set of cards, wherein the second subset of the second set of cards are consecutively numbered from the number one to at least the number ten with numerical indicia on the front surface of the second subset of the second set of cards;
- a third subset of cards each having on the front surface the same or similar third shape as the third subset of the first set of cards, wherein the third subset of the second set of cards are consecutively numbered from the number one to at least the number ten with numerical indicia on the front surface of the third subset of the second set of cards; and
- a fourth subset of cards each having on the front surface the same or similar fourth shape as the fourth subset of the first set of cards, wherein the fourth subset of the second set of cards are consecutively numbered from the number one to at least the number ten with numerical indicia on the front surface of the fourth subset of the second set of cards;

(b) forming a two-by-two matrix on an imaginary or visible grid using two cards of the first player and two cards of the second player, wherein the two cards of the first player are placed in opposite corners of the matrix and the two cards of the second player are placed in different opposite corners of the matrix, wherein the two cards of each of the first player and the second player are selected from the respective player's set of cards, and wherein the two cards of each of the first player and the second player are placed in the matrix in a manner that visually shows to both the first and second players the front surfaces, the color schemes, the shapes, and the numerical indicia of the cards placed in the matrix and indicates which of the placed cards belong to which player;

(c) forming a hand of at least four cards for each of the two players, wherein the hand is formed by having each of the two players select four or more cards from that player's set of cards; and (d) alternating turns of the first player and the second player, wherein in each player's turn, the player is provided with a number of units of currency, and the player having the turn utilizes the currency to perform one or more of:
  (i) placing one or more cards selected from the hand of the player having the turn into an empty space or empty spaces on the grid adjacent to at least one side of a card previously placed on the grid, wherein placing each card costs the player having the turn a designated number of units of the currency, and wherein each of the one or more placed cards selected from the hand of the player having the turn is placed in a manner that visually shows to both the first and second players the front surface, the color scheme, the shape and the numerical indicia of the one or more cards being placed and indicates that the one or more placed cards belong to the player having the turn;
  (ii) moving one or more previously placed cards showing the color scheme of the set of cards of the player having the turn a number of empty spaces on the grid, the number of empty spaces to move determined by the shape included on the previously placed card, wherein after moving the previously placed card, each moved card is adjacent to at least one side of a card previously placed on the grid, wherein moving each previously placed card costs the player having the turn a designated number of units of the currency; and
  (iii) attacking an attacked card with an attacking card, the attacked card being a card of another player previously placed on the grid, the attacking card being a card of the player having the turn previously placed on the grid and positioned adjacent to the attacked card, wherein the attacking card has either a higher numerical indicia than the attacked card or, if the numerical indicia of the attacking card and the attacked card are the same, the attacking card includes a shape designated to be a stronger shape than the shape of the attacked card, wherein the attacking card assumes the position on the grid of the attacked card and the attacked card is removed from the grid, wherein each attack costs the player having the turn a designated number of units of the currency;

wherein a winner of the game is declared when one of the players forms two lines on the grid, wherein a line is defined by a horizontal or vertical line of four in a row of the same player's cards, wherein each of the four cards in the horizontal or vertical line has a different shape and has the color scheme to indicate that all four cards in the row of the line belong to the same player.

15. The method of claim 14,
wherein the first subset of the first set of cards are consecutively numbered from the number one to at least the number ten with numerical indicia on the front surface of the first subset of the first set of cards provided by the number of the same or similar first shapes provided on the front surface;
wherein the second subset of the first set of cards are consecutively numbered from the number one to at least the number ten with numerical indicia on the front surface of the second subset of the first set of cards provided by the number of the same or similar second shapes provided on the front surface;
wherein the third subset of the first set of cards are consecutively numbered from the number one to at least the number ten with numerical indicia on the front surface of the third subset of the first set of cards provided by the number of the same or similar third shapes provided on the front surface; and
wherein the fourth subset of the first set of cards are consecutively numbered from the number one to at least the number ten with numerical indicia on the front surface of the fourth subset of the first set of cards provided by the number of the same or similar fourth shapes provided on the front surface; and
wherein the first subset of the second set of cards are consecutively numbered from the number one to at least the number ten with numerical indicia on the front surface of the first subset of the second set of cards provided by the number of the same or similar first shapes provided on the front surface;

wherein the second subset of the second set of cards are consecutively numbered from the number one to at least the number ten with numerical indicia on the front surface of the second subset of the second set of cards provided by the number of the same or similar second shapes provided on the front surface;

wherein the third subset of the second set of cards are consecutively numbered from the number one to at least the number ten with numerical indicia on the front surface of the third subset of the second set of cards provided by the number of the same or similar third shapes provided on the front surface; and wherein the fourth subset of the second set of cards are consecutively numbered from the number one to at least the number ten with numerical indicia on the front surface of the fourth subset of the second set of cards provided by the number of the same or similar fourth shapes provided on the front surface.

16. The method of claim 14, wherein the game is played in a virtual environment and the steps of the method are executed by a video game application on a computing device.

17. The method of claim 14, wherein in each player's turn, the player having the turn selects whether (i) to place one or more cards selected from the hand of the player having the turn, (ii) to move one or more previously placed cards showing the color scheme of the set of cards of the player having the turn, and/or (iii) to attack an attacked card with an attacking card.

* * * * *